(12) United States Patent
Felix

(10) Patent No.: US 7,652,771 B2
(45) Date of Patent: Jan. 26, 2010

(54) INTERFEROMETER WITH DOUBLE POLARIZING BEAM SPLITTER

(75) Inventor: Greg C Felix, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 268 days.

(21) Appl. No.: 11/931,622

(22) Filed: Oct. 31, 2007

(65) Prior Publication Data
US 2009/0109442 A1  Apr. 30, 2009

(51) Int. Cl.
*G01B 9/02* (2006.01)
(52) U.S. Cl. ...................................... 356/493
(58) Field of Classification Search ......... 356/491–495, 356/487, 488
See application file for complete search history.

(56) References Cited
U.S. PATENT DOCUMENTS

| | | | | |
|---|---|---|---|---|
| 6,897,962 B2* | 5/2005 | Johnstone et al. | ........... | 356/493 |
| 7,212,290 B2* | 5/2007 | Fine et al | ..................... | 356/495 |
| 7,310,152 B2* | 12/2007 | Carlson | ....................... | 356/493 |
| 2003/0038947 A1* | 2/2003 | Hill | ............................. | 356/493 |
| 2003/0164948 A1* | 9/2003 | Hill | ............................. | 356/487 |
| 2007/0223005 A1* | 9/2007 | Lee | ............................. | 356/487 |

\* cited by examiner

*Primary Examiner*—Hwa S Lee (Andrew)

(57) ABSTRACT

An interferometer has a first reflective surface having a nominal orientation; a second reflective surface having a nominal orientation orthogonal to the nominal orientation of the first reflective surface; a retroreflector facing the first reflective surface; a double polarizing beam splitter (DPBS) between the first reflective surface and the retroreflector; and a respective quarter-wave plate between the DPBS and each of the reflective surfaces. The DPBS has first and second beam-splitting surfaces each having a nominal orientation with respect to the first reflective surface. At least part of at least one of the first reflective surface, the second reflective surface and the beam-splitting surfaces is effectively tilted relative to the respective nominal orientation of such surface, and constitutes a respective tilted surface.

24 Claims, 8 Drawing Sheets

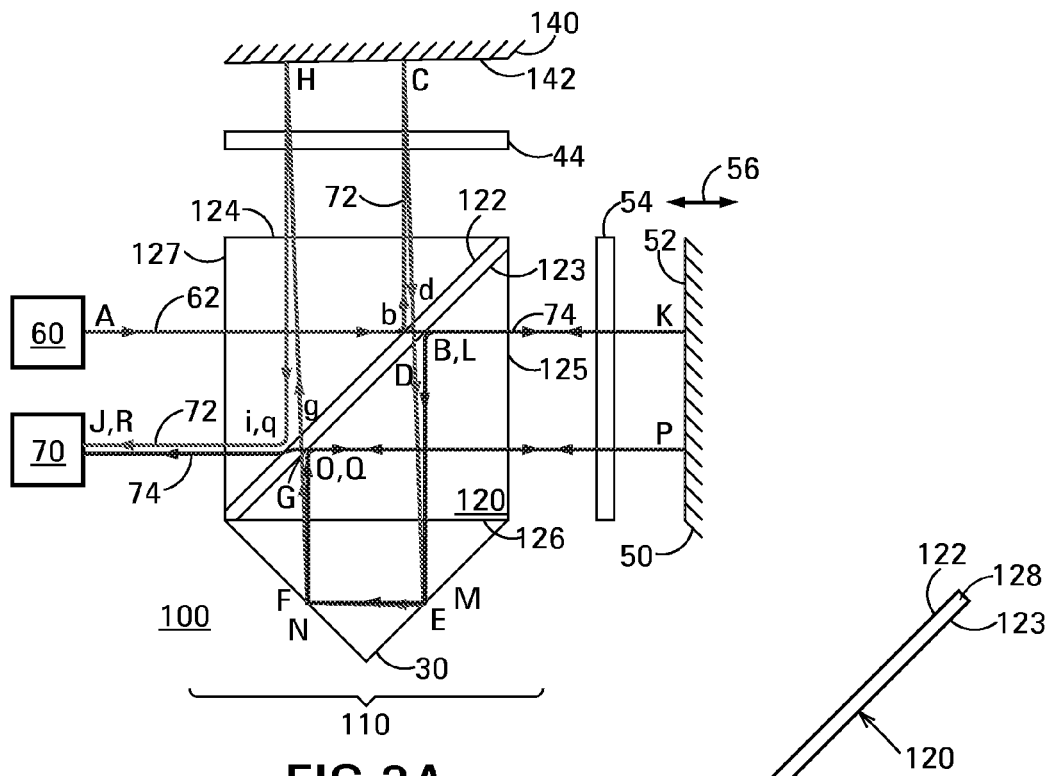
FIG.3A
FIG.3B
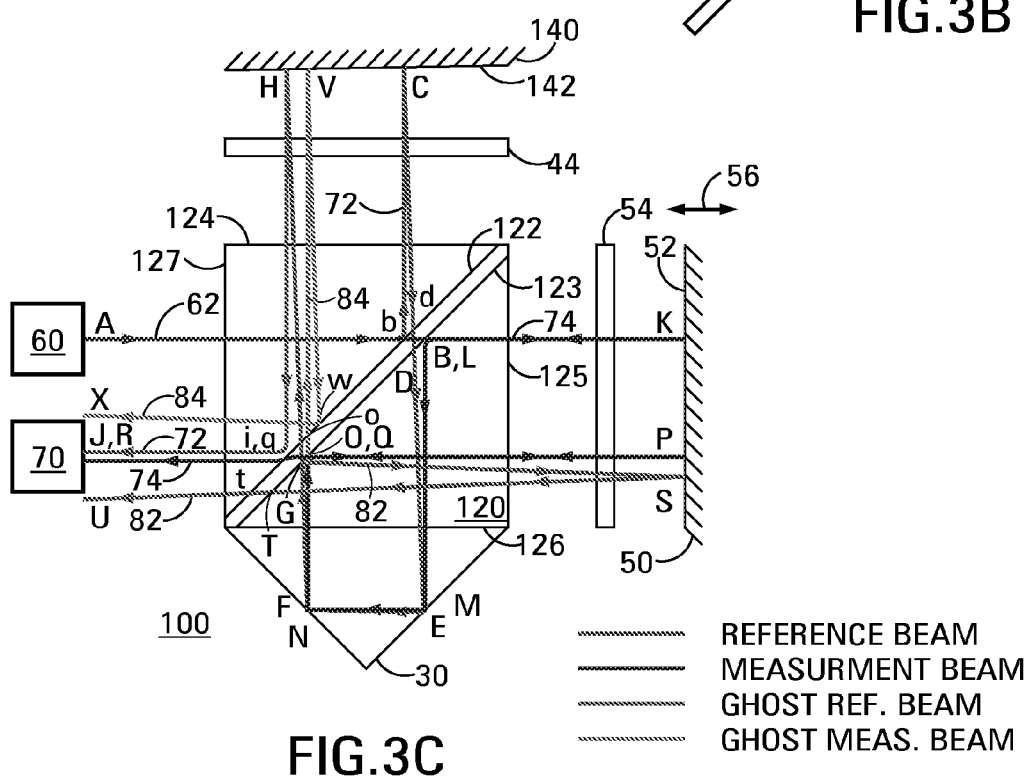
FIG.3C
— — — REFERENCE BEAM
——— MEASURMENT BEAM
— — — GHOST REF. BEAM
——— GHOST MEAS. BEAM

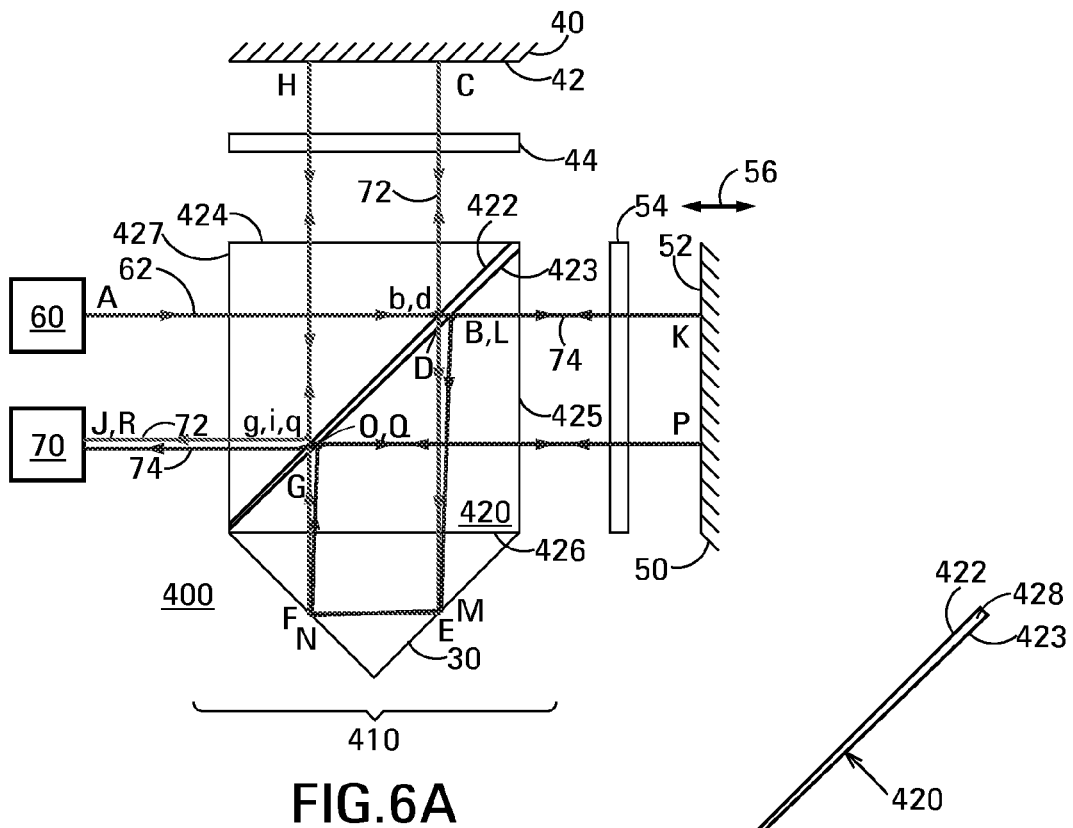
FIG.6A
FIG.6B
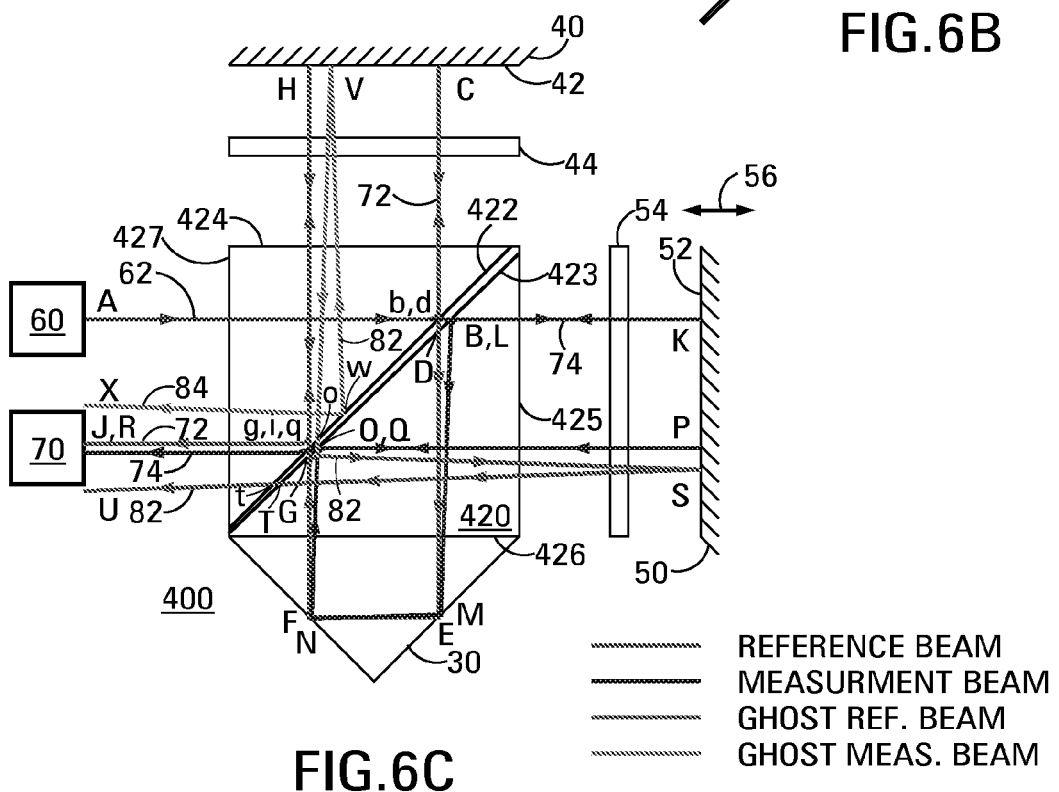
FIG.6C

INTERFEROMETER WITH DOUBLE POLARIZING BEAM SPLITTER

BACKGROUND

Interferometers are widely used to make precision measurements of displacement. FIG. 1 is a schematic drawing showing an example of a conventional high-stability plane mirror interferometer 10. Interferometer 10 is composed of a polarizing beam splitter (PBS) 20 having a single beam-splitting surface 22, a retroreflector 30, a fixed plane mirror 40, a movable plane mirror 50, a quarter-wave plate 44 and a quarter-wave plate 54. Fixed mirror 40 is in a fixed location relative to PBS 20 and has a plane reflective surface 42. Movable mirror 50 is affixed to a body (not shown) whose displacement is to be measured using interferometer 10 and has a plane reflective surface 52. The reflective surface 52 of movable mirror 50 is oriented orthogonally to the reflective surface 42 of fixed mirror 40 and to the direction of motion 56 of movable mirror 50.

PBS 20 is located such that the center of beam-splitting surface 22 is located at a point where a normal to the reflective surface 42 of fixed mirror 40 intersects with a normal to the reflective surface 52 of movable mirror 50. In the example shown, PBS 20 is oriented such that beam-splitting surface 22 is oriented at 45° with respect to the reflective surface 42 of fixed mirror 40. Other orientations of beam-splitting surface 22 are possible. Beam-splitting surface 22 reflects s-polarized light and transmits p-polarized light.

Quarter-wave plate 44 is interposed between PBS 20 and movable mirror 40. Quarter-wave plate 54 is interposed between PBS 20 and movable mirror 50. The surfaces of each quarter-wave plate are oriented parallel to the reflective surface of the respective mirror. Retroreflector 30 is located on the other side of PBS 20 from fixed mirror 40 and faces the fixed mirror. Retroreflector 30 is shown throughout this disclosure as a two-dimensional retroreflector, i.e., a prism, to simplify the drawings. More, typically, retroreflector 30 is a three-dimensional retroreflector, such as a corner cube.

FIG. 1 shows PBS 20, fixed mirror 40 and quarter-wave plates 44 and 54 as separate components to enable these components to be shown clearly. In embodiments in which PBS 20 is configured as a cube having a plane cube surface 24 and a plane cube surface 25 oriented at −45° and +45°, respectively, relative to beam-splitting surface 22, as exemplified in FIG. 1, quarter-wave plates 44 and 54 are affixed to plane cube surfaces 24 and 25, respectively. Additionally, fixed mirror 40 is typically embodied as a reflective layer deposited on the surface of quarter-wave plate 44 remote from cube surface 24.

FIG. 1 additionally shows retroreflector 30 juxtaposed with a cube surface 26 of PBS 20. Cube surface 26 is opposite cube surface 24. Retroreflector 30 may alternatively be spaced from cube surface 26.

A light source 60 is arranged to illuminate the beam-splitting surface 22 of PBS 20 with an incident beam 62 of light whose direction is orthogonal to the reflective surface 52 of movable mirror 50. Incident light beam 62 is composed of a first component having a first polarization and a first frequency and a second component having a second polarization and a second frequency. The first and second frequencies typically differ by a difference that typically ranges from a few MHz to a few tens of MHz. Light source 60 typically comprises a laser (not shown), typically a helium-neon laser.

A measurement beam 72 and a reference beam 74 derived by interferometer 10 from incident light beam 62 emerge from PBS 20 and illuminate a light sensor 70. Sensor 70 generates an electrical signal in response to the measurement beam and the reference beam.

Incident beam 62 is emitted by light source 60 at a location A and is incident at a location B on the beam-splitting surface 22 of PBS 20. The s-polarized component of incident beam 62 is reflected by beam-splitting surface 22 at location B and constitutes a reference beam 72. Reference beam 72 passes through quarter-wave plate 44 and is incident at a location C on the reflective surface 42 of fixed mirror 40.

After the first reflection by fixed mirror 40, reference beam 72 returns along a reciprocal path towards PBS 20. Reference beam 72 passes through quarter-wave plate 44 and is incident at a location D on beam-splitting surface 22. Location D is coincident with location B, described above. Letters indicating nominally-coincident locations are separated by commas in the Figures. Two passes through the quarter-wave plate change reference beam 72 from s-polarized to p-polarized. Consequently, beam-splitting surface 22 transmits the reference beam towards retroreflector 30.

Retroreflector 30 reflects reference beam 72 at locations E and F, after which the reference beam returns to PBS 20 along a path that is parallel to, but offset from, the path of the reference beam between locations D and E. Reference beam 72 is incident on the beam-splitting surface 22 of PBS 20, this time at a location G. Beam-splitting surface 22 transmits reference beam 72 towards fixed mirror 40. Reference beam 72 passes once more through quarter-wave plate 44, and is incident on the reflective surface 42 of fixed mirror 40 at a location H.

After the second reflection by fixed mirror 40, reference beam 72 returns along a reciprocal path towards PBS 20. Reference beam 72 passes through quarter-wave plate 44 a final time and is incident at a location I on the beam-splitting surface 22 of PBS 20. Location I is coincident with location G, described above. The final pass through quarter-wave plate 44 restores reference beam 72 to s-polarized. Consequently, beam-splitting surface 22 reflects reference beam 72, and the reference beam emerges from PBS 20 and is incident on sensor 70 at a location J.

The p-polarized component of incident beam 62 is also incident at location B on the beam-splitting surface 22 of PBS 20. The beam-splitting surface transmits the p-polarized component of incident beam 62 towards movable mirror 50 as a measurement beam 74. Measurement beam 74 passes through quarter-wave plate 54 and is incident at a location K on the reflective surface 52 of movable mirror 50.

After the first reflection by movable mirror 50, measurement beam 74 returns along a reciprocal path towards PBS 20. Measurement beam 74 passes again through quarter-wave plate 54 and is incident at a location L on beam-splitting surface 22. Location L is coincident with locations B and D, described above. Two passes through the quarter-wave plate 54 change measurement beam 74 from p-polarized to s-polarized. Consequently, beam-splitting surface 22 reflects measurement beam 74 towards retroreflector 30.

Retroreflector 30 reflects measurement beam 74 at locations M and N, which are coincident with locations E and F, respectively. Measurement beam 74 then returns to PBS 20, where it is once more incident on the beam-splitting surface 22 of PBS 20, this time at a location O. Location is coincident with locations G and I, described above. Beam-splitting surface 22 reflects measurement beam 74 towards movable mirror 50. Measurement beam 74 passes through quarter-wave plate 54 a third time, and is incident on the reflective surface 52 of movable mirror 50 at a location P.

After the second reflection by movable mirror 50, measurement beam 74 returns along a reciprocal path towards PBS 20. Measurement beam 74 passes a fourth time through the quarter-wave plate 54 and is incident at a location Q on the beam-splitting surface 22 of PBS 20. Location Q is coincident with locations G, I and O, described above. The final pass through quarter-wave plate 54 restores measurement beam 74 to p-polarized. Consequently, beam-splitting surface 22 transmits measurement beam 74, and the measurement beam emerges from PBS 20 and is incident on sensor 70 at a location R.

Location R is coincident with location J. Consequently, measurement beam 74 is nominally superposed with reference beam 72, and the beam axes of reference beam 72 and measurement beam 74 are parallel and coincident. Note that if fixed mirror 40 and movable mirror 50 are not ideally aligned, i.e., the mirrors are not perfectly orthogonal, the beam axes remain parallel, but one beam axis is spatially offset from the other.

Sensor 70 electrically detects the superposed light beams 72 and 74 to generate an electrical signal that includes a signal component generated by the sensor in response to interference between light beams 72, 74. This electrical signal component will be referred throughout this disclosure as a desired interference component. The amplitude of the desired interference component depends in part on two main factors, namely, the angle between the beam axes of light beams 72 and 74 and the distance between the beam axes of the light beams. The amplitude of the desired interference component is maximized when the beam axes of light beams 72 and 74 are parallel. The amplitude of the desired interference component generated in response to interference between two light beams, such as reference beam 72 and measurement beam 74, having a Gaussian intensity distribution falls off approximately as $\exp(-(2w/d)^2)$, where d is the diameter of the beams, and w is the spatial separation between the beam axes of the beams, i.e., the spatial separation between the beam axis of reference beam 72 and the beam axis of measurement beam 74. In interferometer 10, spatial separation w is approximately $4L\theta$, where L is approximately equal to the distance from the apex of retroreflector 30 to fixed mirror 40, and $\theta$ is the angle between fixed mirror 40 and an ideally-aligned fixed mirror 40, i.e., a fixed mirror 40 that is oriented exactly orthogonally with respect to movable mirror 50.

Imperfections in one of more of the components of a conventional interferometer, such as interferometer 10 shown in FIG. 1, typically subject the interferometer to ghost beams. FIGS. 2A and 2B are schematic drawings showing examples of ghost beams to which conventional interferometer 10 is typically subject. Examples of imperfections in one or more of the components of the interferometer are reflections at the cube surfaces 24, 26 of PBS 20, reflections at the surfaces of quarter-wave plates 44 and 54, transmittal of s-polarized light and reflection of p-polarized light at beam-splitting surface 22, and retroreflector 30 having imperfect polarization properties. FIG. 2A shows a ghost beam that originates as the result of reference beam 72 incident on beam-splitting surface 22 comprising an unwanted s-polarized component. This ghost beam will be referred to a ghost reference beam 82. FIG. 2B shows a ghost beam that originates as a result of measurement beam 74 comprising an unwanted p-polarized component. This ghost beam will be referred to a ghost measurement beam 84. Other ghost beams are possible.

FIG. 2A shows the path of ghost reference beam 82. Ghost reference beam 82 is a result of reference beam 72 incident at location G on the beam-splitting surface 22 of PBS 20 comprising an unwanted s-polarized component, typically due to retroreflector 30 having non-ideal polarization properties. Beam-splitting surface 22 reflects the s-polarized component as ghost reference beam 82.

Beam-splitting surface 22 reflects ghost reference beam 82 towards movable mirror 50. Ghost reference beam 82 is incident at a location S on the reflective surface 52 of movable mirror 50. Location S is coincident with location P, described above.

After reflection once by fixed mirror 40 and once by movable mirror 50, ghost reference beam 82 returns along a reciprocal path towards PBS 20. Ghost reference beam 82 passes a second time through quarter-wave plate 52 and is incident at a location T on the beam-splitting surface 22 of PBS 20. Location T is coincident with locations G, I, O and Q, described above. Passing twice through quarter-wave plate 54 twice changes ghost reference beam 82 to p-polarized. Consequently, beam-splitting surface 22 transmits ghost reference beam 82, and the ghost reference beam emerges from PBS 20 superposed with the desired beams, i.e., reference beam 72 and measurement beam 74. Ghost reference beam 82 is incident on sensor 70 at a location U, which is coincident with locations J and R. The beam axis of ghost reference beam 82 is parallel to and coincident with the beam axes of desired beams 72, 74. Consequently, ghost reference beam 82 interferes strongly with desired beams 72, 74 at the sensor.

Between light source 60 and sensor 70, ghost reference beam 82 is reflected once by fixed mirror 40 and once by movable mirror 50, whereas reference beam 72 is reflected twice by fixed mirror 40 and measurement beam 74 is reflected twice by movable mirror 50. Consequently, a given displacement of movable mirror 50 subjects ghost reference beam 82 to a phase change equal to one half of the phase change to which the same displacement of the movable mirror subjects measurement beam 74. Interference between ghost reference beam 82 and the desired beams 72, 74 imposes a cyclic error term with a period of $\lambda/2$, where $\lambda$ is the nominal wavelength of the light output by light source 60, on the electrical signal generated by sensor 70. In other words, when movable mirror 50 is displaced by a distance equal to $\lambda/2$, ghost reference beam 82 imposes a full cycle of an approximately sinusoidal error on the electrical signal generated by sensor 70.

FIG. 2B shows the path of ghost measurement beam 84. Ghost measurement beam 84 is a result of measurement beam 74 incident at location O on beam-splitting surface 22 comprising an unwanted p-polarized component, typically due to retroreflector 30 having non-ideal polarization properties. Beam-splitting surface 22 transmits the p-polarized component of the measurement beam towards fixed mirror 40 as a ghost measurement beam 84.

Beam-splitting surface 22 transmits ghost measurement beam 84 towards fixed mirror 40. Ghost measurement beam 84 passes through quarter-wave plate 44 and is incident at a location V on the reflective surface 42 of fixed mirror 40. Location V is coincident with location H, described above.

After reflection once by movable mirror 50 and once by fixed mirror 40, ghost measurement beam 84 returns along a reciprocal path towards PBS 20. Ghost measurement beam passes a second time through quarter-wave plate 44 and is incident at a location W on the beam-splitting surface 22 of PBS 20. Location W is coincident with locations G, I, O and Q, described above. Passing through quarter-wave plate 44 twice changes ghost measurement beam 84 to s-polarized. Consequently, beam-splitting surface 22 reflects ghost measurement beam 84, and the ghost measurement beam emerges from PBS 20 superposed with the desired beams, i.e., reference beam 72 and measurement beam 74. Ghost measurement beam 84 is incident on sensor 70 at a location X, which is coincident with locations J and R. The beam axis of ghost measurement beam 84 is parallel to and coincident with the beam axes of desired beams 72, 74. Consequently, ghost beam 84 interferes strongly with desired beams 72, 74 at the sensor.

Between light source 60 and sensor 70, ghost measurement beam 84 is reflected once by fixed mirror 40 and once by movable mirror 50, whereas reference beam 72 is reflected twice by fixed mirror 40 and measurement beam 74 is reflected twice by movable mirror 50. Consequently, a given displacement of movable mirror 50 subjects ghost measurement beam to a phase change equal to one half of the phase change to which the same displacement of the movable mirror subjects measurement beam 74. Interference between ghost measurement beam 84 and the desired beams 72, 74 imposes a cyclic error term with a period of $\lambda/2$, where $\lambda$ is the nominal wavelength of the light output by light source 60, on the electrical signal generated by sensor 70. In other words, when movable mirror 50 is displaced by a distance equal to $\lambda/2$, ghost measurement beam 84 imposes a full cycle of an approximately sinusoidal error on the electrical signal generated by sensor 70.

It is known in the art that the effect of ghost beams such as ghost reference beam 82 and ghost measurement beam 84 can be mitigated by tilting one or more of the surfaces of the interferometer at which light is reflected. Light reflected by such tilted reflective surface is neither parallel to nor orthogonal to the direction of incident light beam 62. Reflective surfaces that can be tilted include the reflective surface 42 of fixed mirror 40, the reflective surface 52 of movable mirror 50 and the beam-splitting surface 22 of PBS 20. The reflective surface of each mirror can be tilted such that the reflective surface is no longer orthogonal to the reflective surface of the other mirror. Beam-splitting surface 22 can be tilted such that it is oriented at an angle different from 45° to the normal to the reflective surface of each of the mirrors 40, 50. More than one of the above-mentioned reflective surfaces may be tilted.

Tilting one or more of the reflective surfaces of interferometer 10 mitigates the effect of ghost beams 82, 84 by causing the ghost beams to emerge from PBS 20 with their beam axes diverging from those of the desired beams, i.e., reference beam 72 and measurement beam 74. Consequently, at sensor 70, the beam axes of ghost beams 82, 84 diverge from those of desired beams 72, 74 and the beam axes of the ghost beams are spatially offset from those of the desired beams. The spatial offset of the beam axes of ghost beams 82, 84 from those of desired beams 72, 74 and the beam axes of ghost beams 82, 84 diverging from those of desired beams 72, 74 significantly reduce the level of the component of the electrical signal generated by sensor 70 in response to interference between ghost beams 82 and 84 on one hand and desired beams 72, 74 on the other hand.

However, tilting one or more of the reflective surfaces of interferometer 10 additionally introduces a spatial offset between the beam axes of reference beam 72 and measurement beam 74 as these beams emerge from PBS 20, even though the beam axes of reference beam 72 and measurement beam 74 typically remain parallel. The spatial offset between the beam axes of reference beam 72 and measurement beam 74 at sensor 70 undesirably reduces the amplitude of the desired interference signal, i.e., the component in the electrical signal generated by sensor 70 in response to interference between desired beams 72, 74. Thus, compared with an interferometer such as interferometer 10 having no tilted reflective surface, the desired interference component generated by an interferometer having at least one tilted reflective surface has a reduced amplitude and, hence, a reduced signal-to-noise ratio. This impairs the accuracy of the displacement measurements made using such interferometer.

What is needed, therefore, is an interferometer in which the effect of ghost beams is mitigated in a way does not degrade the signal-to-noise ratio of the desired interference component of the electrical signal generated by the sensor.

BRIEF DESCRIPTION OF THE DRAWINGS

Conventional interferometers and examples of interferometers and optical assemblies in accordance with various embodiments of the invention are described below with reference to the following drawings. In the drawings, two or more different light beams that travel nominally along the same path are shown spatially offset from one another to enable each of the light beams to be shown. Where two different light beams travel along a common path, the light beams are shown spatially offset from the common path by equal distances and in opposite directions. Where three different light beams travel along a common path, one of the light beams is shown travelling along the common path, and the remaining two light beam are shown spatially offset from the common path by equal distances and in opposite directions.

Two drafting artifacts are used to help indicate the paths of some of the light beams more clearly. Some of the light beams are shown as exhibiting a dog-leg where they transition from an exclusive path to a common path, or vice versa. Some of the light beams exhibit a curved segment that connects an incident beam to a reflected beam. The curved segment indicates the direction of the incident light beam that is reflected. Moreover, refraction where light passes non-orthogonally through a surface between materials having different refractive indices is not shown on the assumption that such refraction effects are small.

FIG. 3A is a schematic drawing showing an example of an interferometer in accordance with an embodiment of the invention in which the fixed mirror is physically tilted in its entirety.

FIG. 3B is a schematic drawing showing another example of the double polarizing beam splitter that constitutes part of the interferometer shown in FIG. 3A.

FIG. 3C is a schematic drawing showing examples of the ghost beams to which the interferometer shown in FIG. 3A is subject.

FIG. 6A is a schematic drawing showing an example of an interferometer in accordance with an embodiment of the invention in which the second beam-splitting surface of the double polarizing beam splitter is physically tilted in its entirety.

FIG. 6B is a schematic drawing showing another example of the double polarizing beam splitter that constitutes part of the interferometer shown in FIG. 6A.

FIG. 6C is a schematic drawing showing examples of the ghost beams to which the interferometer shown in FIG. 6A is subject.

DETAILED DESCRIPTION

Figure 1:
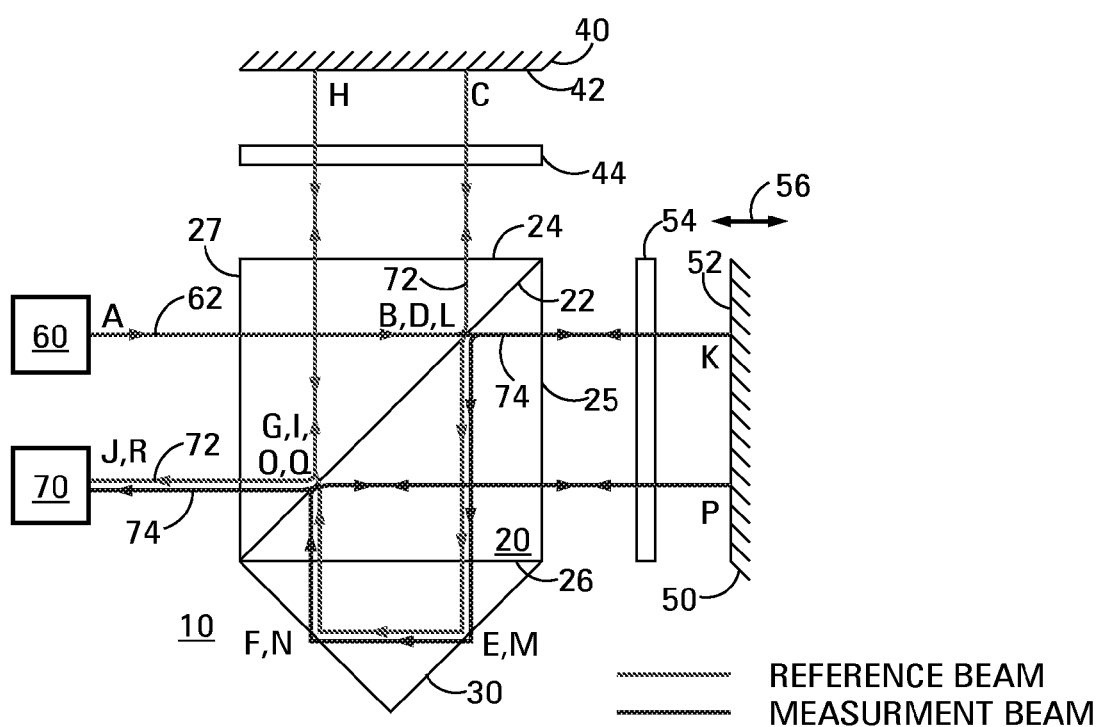
FIG. 1 is a schematic drawing showing an example of a conventional high-stability plane mirror interferometer.
Figure 2A:
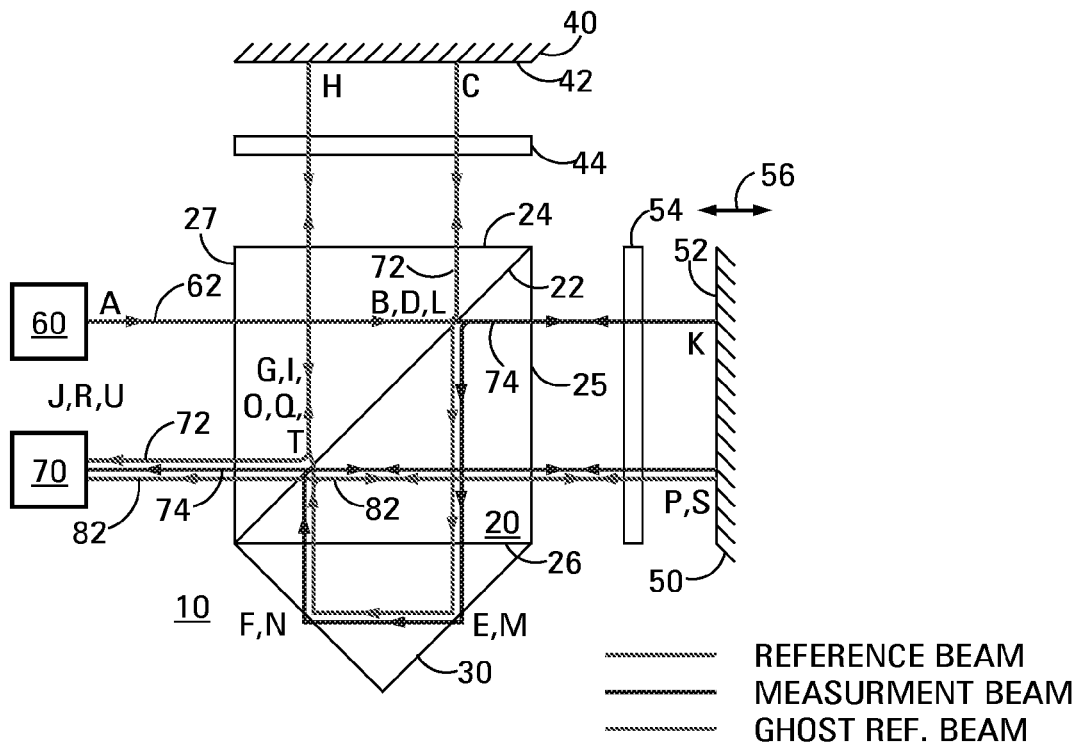
FIGS. 2A and 2B are schematic drawings showing examples of ghost beams to which the conventional interferometer shown in FIG. 1 is subject.
Figure 2B:
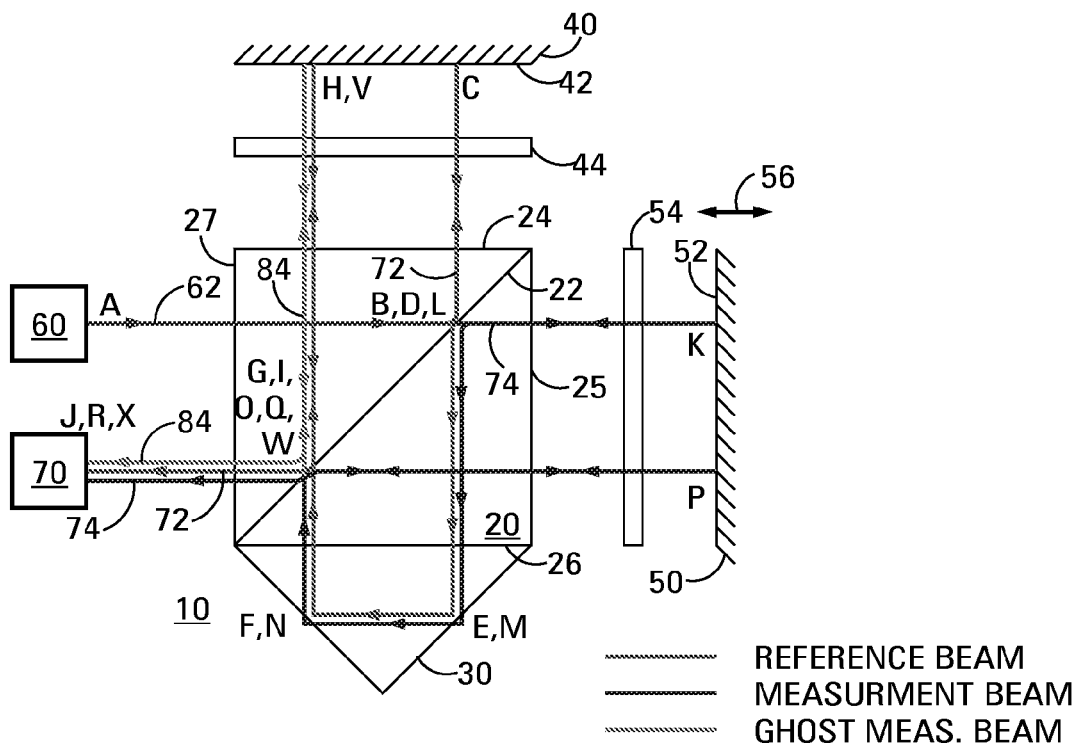

Embodiments of the invention provide an interferometer in which the effects of ghost beams are mitigated without an undesired degradation of the signal-to-noise ratio of the desired interference component generated in response to interference between the reference beam and the measurement beam. Such interferometer comprises a first reflective surface, a second reflective surface, a retroreflector, a double polarizing beam splitter (DPBS), a first quarter-wave plate and a second quarter-wave plate. The first reflective surface has a nominal orientation. The second reflective surface has a nominal orientation orthogonal to the nominal orientation of the first reflective surface. The retroreflector faces the first reflective surface. The DPBS is located between the first reflective surface and the retroreflector, and comprises a first beam-splitting surface and a second beam-splitting surface. The beam-splitting surfaces each have nominal orientation at 45° with respect to the nominal orientation of the first reflective surface. The first quarter-wave plate is located between the DPBS and the first reflective surface. The second quarter-wave plate is located between the DPBS and the second reflective surface. At least part of at least one of the first reflective surface, the second reflective surface, the first beam-splitting surface and the second beam-splitting surface is effectively tilted relative to the respective nominal orientation of such surface, and constitutes a respective tilted surface.

Typically, the interferometer additionally comprises a light source and a light sensor. The light source is operable to emit a beam of incident light towards the first beam-splitting surface in a direction orthogonal to the nominal orientation of the second reflective surface. The light sensor is positioned to receive a first desired light beam and a second desired light beam that emerge from the DPBS, the first desired light beam after being reflected twice by the first reflective surface, the second desired light beam after being reflected twice by the second reflective surface.

Due to imperfections in the optical elements of the interferometer, at least one ghost light beam derived from the beam of incident light additionally emerges from the DPBS. The tilted surface is effectively tilted such that each of the ghost light beams emerges from the DPBS angularly separated from the desired light beams by a separation angle greater than a minimum separation angle.

The desired light beams emerge from the DPBS, one after being reflected twice by the tilted surface, the other having not been reflected by the tilted surface. The tilted surface has a tilt that imposes a first spatial offset on the one of the desired light beams. The first beam-splitting surface and the second beam-splitting surface are separated by a separation distance that imposes a second spatial offset on the other of the desired light beams. The second spatial offset is nominally equal to the first spatial offset.

Other embodiments of the invention provide an optical assembly that mitigates the effects of ghost beams. Such optical assembly comprises a reflective surface, a retroreflector, a double polarizing beam splitter (DPBS), a first quarter-wave plate and a second quarter-wave plate. The reflective surface has a nominal orientation. The retroreflector is arranged so that it faces the reflective surface. The DPBS is located between the reflective surface and the retroreflector, and comprises a first beam-splitting surface facing the reflective surface and a second beam-splitting surface facing the retroreflector. Each of the beam-splitting surfaces has a nominal orientation with respect to the nominal orientation of the reflective surface. The first quarter-wave plate is located between the DPBS and the reflective surface. The second quarter-wave plate faces the second beam-splitting surface, and is oriented nominally orthogonally to the first quarter-wave plate. At least part of at least one of the reflective surface, the first beam-splitting surface and the second beam-splitting surface is effectively tilted relative to its respective nominal orientation, and constitutes a respective tilted surface.

FIG. 3A is a schematic drawing showing an example of an interferometer 100 in accordance with an embodiment of the invention. Interferometer 100 is composed of a double polarizing beam splitter (DPBS) 120, retroreflector 30, a fixed plane mirror 140, a movable plane mirror 50, a quarter-wave plate 44 and a quarter-wave plate 54. Fixed mirror 140 is in a fixed location relative to DPBS 120 and has a plane reflective surface 142. Reflective surface 142 has a nominal orientation. Movable mirror 50 is affixed to a body (not shown) whose displacement is to be measured using interferometer 100 and has a plane reflective surface 52. The reflective surface 52 of movable mirror 50 has a nominal orientation orthogonal to the nominal orientation of reflective surface 142 of fixed mirror 140 and to the direction of motion 56 of movable mirror 50. In some applications, the body to which movable mirror 50 is affixed is capable of rotation about one or more axes orthogonal to the direction of motion. The range of such rotation is typically small, e.g., less than ±2 milliradians. Rotation of the body subjects the orientation of movable mirror 50 to a similar rotation. In some examples, movable mirror 50 is implemented using a single retroreflector, or a retroreflector for each beam on the movable mirror. In such examples, reflective surface 52 is a virtual reflective surface having a nominal orientation orthogonal to the incident beam.

DPBS 120 has a first beam-splitting surface 122 and a second beam-splitting surface 123. Each of the beam-splitting surfaces 122, 123 reflects s-polarized light and transmits p-polarized light. Second beam-splitting surface 123 is spatially offset from first beam-splitting surface 122 by a predetermined separation distance. In this embodiment, beam-splitting surfaces 122 and 123 are disposed parallel to one another. Each of the beam-splitting surfaces 122, 123 has a nominal orientation with respect to the nominal orientation of reflective surface 142 of fixed mirror 140. In the example shown, the nominal orientation of each of the beam-splitting surfaces 122, 123 is at 45° with respect to the nominal orientation of fixed mirror 142. In another example, the nominal orientation of each of the beam-splitting surfaces 122, 123 is at Brewster's angle (about 56°) with respect to the nominal orientation of fixed mirror 142. Other nominal orientations are possible within a range that typically extends from about 40° to about 70° with respect to the nominal orientation of fixed mirror 142. Orientations outside this range can also be used.

DPBS 120 is located such that a normal (not shown) to the nominal orientation of reflective surface 142 of fixed mirror 140 intersects with a normal (not shown) to the reflective surface 52 of movable mirror 50 within the DPBS. DPBS 120 is oriented such that first beam-splitting surface 122 faces fixed mirror 140 and second beam-splitting surface 123 faces movable mirror 52 and first beam-splitting surface 122 is oriented at its nominal orientation with respect to the nominal orientation of fixed mirror 142, as described above.

In the example shown in FIG. 3A, DPBS 120 is embodied as a double beam-splitting cube that has plane cube surfaces 124, 125, 126 and 127 in clockwise order. Cube surface 124 faces fixed mirror 140. Opposed cube surfaces 124 and 126 are oriented at –45° relative to beam-splitting surfaces 122 and 123. Opposed cube surfaces 125 and 127 are orthogonal to cube surfaces 124 and 126.

FIG. 3B is a schematic drawing showing another example of DPBS 120. In this example, DPBS 120 is composed of a parallel-sided slab 128 of a transparent material, such as glass. Layers (not separately shown) of a polarizing beam-splitting material are deposited on the opposed major surfaces of slab 128 to provide beam-splitting surfaces 122 and 123. The slab is mounted with first beam-splitting surface 122 at its nominal orientation with respect to the nominal orientation of the reflective surface 142 of fixed mirror 140.

Referring again to FIG. 3A, quarter-wave plate 44 is interposed between DPBS 120 and fixed mirror 140. Quarter-wave plate 54 is interposed between DPBS 120 and movable mirror 50. The surfaces of quarter-wave plate 44 are oriented parallel to the nominal orientation of the reflective surface 142 of fixed mirror 140. The surfaces of quarter-wave plate 54 are oriented orthogonal to those of quarter-wave plate 44. Retroreflector 30 is located on the other side of DPBS 120 from fixed mirror 140 and faces the fixed mirror. As noted above, retroreflector 30 is shown throughout this disclosure as a two-dimensional retroreflector, i.e., a prism, to simplify the drawings. More, typically, retroreflector 30 is a three-dimensional retroreflector, such as a corner cube.

In interferometer 100, at least part of the reflective surface 142 of fixed mirror 140 is effectively tilted relative to its nominal orientation by physically tilting reflective surface 142 in its entirety. Each of the reflective surface 52 of movable mirror 50 and the first beam-splitting surface 122 and the second beam-splitting surface 123 of DPBS 120 is oriented at its respective nominal orientation. Optionally, at least part of one or more of reflective surface 52, first beam-splitting surface 122 and second beam-splitting surface 123 is additionally tilted relative to its respective nominal orientation. Each surface that is tilted relative to its nominal orientation reflects light having a direction of incidence parallel or orthogonal to a normal to the nominal orientation of the reflective surface 142 of fixed mirror 140 in a direction of reflection neither parallel nor orthogonal to the direction of incidence.

The example of interferometer 100 shown in FIG. 3A is additionally composed of a light source 60 and a light sensor 70. Light source 60 is operable to emit a beam 62 of incident light towards first beam-splitting surface 122 of DPBS 120 in a direction orthogonal to the nominal orientation of the reflective surface 52 of movable mirror 50. Incident light beam 62 is composed of a first component having a first polarization and a first frequency and a second component having a second polarization and a second frequency. The first and second frequencies typically differ by a difference that typically ranges from a few MHz to a few tens of MHz. Light source 60 typically comprises a laser (not shown), typically a helium-neon laser.

Light sensor 70 is located facing the first beam-splitting surface 122 of DPBS 120 to receive reference beam 72 and measurement beam 74 that emerge from DPBS 120. Reference beam 72 is obtained by twice reflecting the s-polarized component of incident light beam 62 using the reflective surface 142 of fixed mirror 140. Measurement beam 74 is obtained by twice reflecting the p-polarized component of incident light beam 62 using the reflective surface 52 of movable mirror 50. Sensor 70 generates an electrical signal in response to the reference beam and the measurement beam. Reference beam 72 and measurement beam 74 are superposed at the sensor so that the electrical signal generated by the sensor includes a desired interference component resulting from interference between the reference beam and the measurement beam.

In the example of interferometer 100 shown in FIG. 3A, DPBS 120, quarter-wave plates 44 and 54 and fixed mirror 140 are shown as separate components to enable these components to be shown clearly. In embodiments in which DPBS 120 is embodied as a double beam-splitting cube, also as shown in FIG. 3A, quarter-wave plates 44 and 54 are typically affixed to the cube surfaces 124 and 125, respectively, of DPBS 120. Additionally, fixed mirror 140 may be implemented as a wedge of a transparent material, such as glass, having a layer of reflective material, such as aluminum or gold, on one of its tapered surfaces. The reflective material provides reflective surface 142, and the taper of the wedge defines the tilt of reflective surface 142. Such implementation of fixed mirror 140 is mounted on quarter-wave plate 44 and DPBS 120 with the surface of the wedge opposite reflective surface 142 affixed to the surface of quarter-wave plate 44 remote from the DPBS.

In another example, DPBS 120 is implemented as a double beam-splitting cube in which the cube surface 124 of DPBS 120 facing fixed mirror 140 is tilted relative to its nominal orientation by a tilt equal to the desired tilt of reflective surface 142. Quarter-wave plate 44 (with its thickness suitably reduced in some embodiments) is affixed to tilted cube surface 124 and reflective material is deposited as described above on the surface of quarter-wave plate 44 remote from cube surface 124. The reflective material deposited on quarter-wave plate 44 provides tilted reflective surface 142.

In the example shown in FIG. 3A, retroreflector 30 is shown affixed to the cube surface 126 of DPBS 120. Retroreflector 30 may alternatively be spaced from cube surface 126. In another example, DPBS 120 is implemented as a double beam-splitting cube, and the prism that provides the cube surfaces 125 and 126 of DPBS 120 and retroreflector 30 are fabricated from the same piece of optical material as a single optical element.

Regardless of whether two or more of DPBS 120, quarter-wave plates 44 and 54, retroreflector 30 and fixed mirror 140 are affixed to one another, DPBS 120, quarter-wave plates 44 and 54, retroreflector 30 and fixed mirror 140 arranged as described above collectively constitute an optical assembly 110 in accordance with an embodiment of the invention. An interferometer similar to interferometer 100 for measuring the displacement of a body (not shown) can be conveniently fabricated using such optical assembly 110 together with a suitable light source and detector, and a movable mirror mounted on the body.

As will be described in greater detail below with reference to FIG. 3C, ghost beams derived from incident beam 62 as a result of imperfections in the elements of interferometer 100 additionally emerge from DPBS 120 and are incident on light sensor 70. Tilting the reflective surface 142 of fixed mirror 140 causes such ghost beams to emerge from DPBS 120 with their beam axes diverging from the beam axes of the desired beams, i.e., reference beam 72 and measurement beam 74. The beam axes of the ghost beams diverging from those of the desired beam spatially offsets the beam axes of the ghost beams from those of the desired beams at sensor 70. The beam axes of the ghost beams diverging from those of the desired beams and the spatial offset between the beam axes of the ghost beams and the desired beams reduces the unwanted interference between the ghost beams and the desired beams in a manner similar to that described above.

The tilt of reflective surface 142, i.e., the angle between the actual orientation of reflective surface 142 and the nominal orientation of reflective surface 142, is set such that each ghost beam that emerges from DPBS 120 is angularly separated from desired beams 72, 74 by a respective separation angle greater than a minimum separation angle. The minimum separation angle is that which ensures that the level of any unwanted interference component generated by sensor 70 in response to interference between the ghost beams and desired beams 72, 74 is below an acceptable threshold level. Furthermore, the tilt of reflective surface 142 is set such that the separation angle remains greater than the minimum separation angle over the entire range of movement of the movable body (not shown) to which movable mirror 50 is affixed. The tilt of reflective surface 142 is typically additionally set such that the separation angle remains greater than the minimum separation angle over the entire range of the above-described rotation to which the orientation of movable mirror 50 is subject.

As noted above, simply tilting reflective surface 142 imposes a spatial offset on the position at which reference beam 72 emerges from DPBS 120, and a consequent a spatial offset between the beam axes of reference beam 72 and measurement beam 74. The spatial offset of the beam axes undesirably reduces the amplitude of the desired interference component generated by sensor 70 in response to interference between desired beams 72, 74. In DPBS 120, first reflective surface 122 reflects only reference beam 72, whereas second reflective surface 123 reflects only measurement beam 74. Second beam-splitting surface 123 is spatially offset from first beam-splitting surface 122 in a direction parallel to a normal to the nominal orientation of reflective surface 52. By reflecting measurement beam 74 using a beam-splitting surface different from that used to reflect reference beam 72, DPBS 120 imposes a spatial offset on the position at which measurement beam 74 emerges from DPBS. The spatial separation between second beam-splitting surface 123 and first beam-splitting surface 122 is set such that second beam-splitting surface 123 imposes a spatial offset on measurement beam 74 nominally equal to the spatial offset imposed on reference beam 72 by the tilt of reflective surface 142. As a result, the beam axes of the reference beam and the measurement beam are collinear, i.e., the beam axes lie on the same straight line. This maximizes the amplitude of desired interference component generated by sensor 70 in response to interference between desired beams 72, 74. An alignment operation is typically performed to make the beam axes of the reference beam and the measurement beam collinear.

Operation of the example of interferometer 100 shown in FIG. 3A will now be described. Incident beam 62 is emitted by light source 60 at a location A and is incident at a location b on the first beam-splitting surface 122 of DPBS 120. The s-polarized component of incident beam 62 is reflected by first beam-splitting surface 122 and constitutes reference beam 72. Reference beam 72 passes through quarter-wave plate 44 and is incident at a location C on the reflective surface 142 of fixed mirror 140. Due to the tilt of reflective surface 142, reference beam 72 is incident at a non-zero angle of incidence. In this disclosure, angles of incidence, reflection and refraction are all measured relative to the normal to the surface. Consequently, reflective surface 142 reflects reference beam 72 back towards DPBS 120 along a non-reciprocal path that is neither parallel nor orthogonal to incident beam 62.

After the first reflection by fixed mirror 140, reference beam 72 passes back through quarter-wave plate 44. Two passes through quarter-wave plate 44 change reference beam 72 from s-polarized to p-polarized. Reference beam is incident at a location d on first beam-splitting surface 122. Location d is spatially offset from location b, described above. First beam-splitting surface 122 transmits the reference beam towards second beam-splitting surface 123. Reference beam 72 is incident at a location D on second beam-splitting surface 123. Second beam-splitting surface 123 transmits the reference beam towards retroreflector 30.

Retroreflector 30 reflects reference beam 72 at locations E and F, after which the reference beam passes back into DPBS 120 along a path that is parallel to, but offset from, the path of the reference beam between locations D and E.

Reference beam 72 is again incident on the second beam-splitting surface 123 of DPBS 120, this time at a location G. Second beam-splitting surface 123 transmits reference beam 72 towards first beam-splitting surface 122. Reference beam in incident at a location g on first beam-splitting surface 122. First beam-splitting surface 122 transmits the reference beam towards fixed mirror 140. Reference beam 72 passes once more through quarter-wave plate 44, and is incident on the reflective surface 142 of fixed mirror 140 at a location H. Due to the tilt of reflective surface 142, reference beam 72 is incident at a non-zero angle of incidence. Consequently, reflective surface 142 reflects reference beam 72 back towards DPBS 120 along a non-reciprocal path that is orthogonal to the direction of incident beam 62.

After the second reflection by fixed mirror 140, reference beam 72 passes again through quarter-wave plate 44. The final pass through quarter-wave plate 44 restores reference beam 72 to s-polarized. Reference beam 72 is incident at a location i on the first beam-splitting surface 122 of DPBS 120. Location i is spatially offset from location g, described above. First beam-splitting surface 122 reflects reference beam 72 towards sensor 70. After reflection, the reference beam emerges from DPBS 120 in a direction parallel to incident beam 62 and is incident on sensor 70 at a location J.

The p-polarized component of incident beam 62 is also incident at location b on the first beam-splitting surface 122 of DPBS 120. The first beam-splitting surface transmits the p-polarized component of incident beam 62 towards a location B on the second beam-splitting surface 123 of DPBS 120 as a measurement beam 74. Second beam-splitting surface 123 transmits measurement beam 74 towards movable mirror 50. Measurement beam 74 passes through quarter-wave plate 54 and is incident at a zero angle of incidence at a location K on the reflective surface 52 of movable mirror 50. Reflective surface 52 reflects measurement beam 74 back towards DPBS 120 along a reciprocal path.

After the first reflection by movable mirror 50, measurement beam 74 passes back through quarter-wave plate 54. Two passes through the quarter-wave plate 54 change the measurement beam 74 from p-polarized to s-polarized. Measurement beam 74 is incident at a location L on second beam-splitting surface 123. Location L is coincident with location B, described above. Second beam-splitting surface 123 reflects measurement beam 74 towards retroreflector 30 along a path that is orthogonal to incident beam 62.

Retroreflector 30 reflects measurement beam 74 at locations M and N, after which the measurement beam passes back into DPBS 120 along a path that is parallel to, but offset from, the path of the measurement beam between locations L and M.

Measurement beam 74 is incident on the second beam-splitting surface 123 of DPBS 120 once more, this time at a location O. Location O is spatially offset from location G, where reference beam 72 is incident on second beam-splitting surface 123. Second beam-splitting surface 123 reflects measurement beam 74 towards movable mirror 50. Measurement beam 74 passes through quarter-wave plate 54 and is incident at a zero angle of incidence at a location P on the reflective surface 52 of movable mirror 50. Reflective surface 52 reflects measurement beam 74 back towards DPBS 120 along a reciprocal path.

After the second reflection by movable mirror 50, measurement beam 74 passes once more through the quarter-wave plate 54. The final pass through quarter-wave plate 54 restores measurement beam 74 to p-polarized. Measurement beam 74 is incident at a location Q on the second beam-splitting surface 123 of DPBS 120. Location Q is coincident with location O, described above. Second beam-splitting surface 123 transmits measurement beam 74 towards first beam-splitting surface 122. Measurement beam 74 is incident at a location q on first beam-splitting surface 122. Location q is coincident with location i, described above. First beam-splitting surface 122 transmits measurement beam 74 towards sensor 70.

After transmission by first beam-splitting surface 122, measurement beam 74 emerges from DPBS 120 and is incident on sensor 70 at a location R. In a manner similar to that described above, sensor 70 electrically detects the superposed light beams 72 and 74 to generate an electrical signal that includes a desired interference component that represents the interference between light beams 72 and 74.

Location R is coincident with location J. Measurement beam 74 is nominally superposed with reference beam 72, and the beam axes of reference beam 72 and measurement beam 74 are parallel and coincident. Note that if the separation between the first beam-splitting surface 122 and second beam-splitting surface 123 does not impose a spatial offset on the measurement beam equal to the spatial offset imposed on the reference beam by the tilt of reflective surface 142, the beam axes remain parallel, but are spatially offset from one another.

The elements of interferometer 100 are subject to defects similar to those described above, so that interferometer 100 is subject to ghost beams. FIG. 3C is a schematic diagram that additionally shows the paths of exemplary ghost beams, i.e., ghost reference beam 82 and ghost measurement beam 84, in interferometer 100. The paths of reference beam 72 and measurement beam 74, i.e., desired beams 72, 74, shown in FIG. 3C are the same as those described above with reference to FIG. 3A.

As noted above, after reflection once by fixed mirror 140, reference beam 72 is incident at location G on the second beam-splitting surface 123 of DPBS 120. Second beam-splitting surface 123 reflects an unwanted s-polarized component of reference beam 72 towards movable mirror 50 as ghost reference beam 82. Due to the tilt of the reflective surface 142 of fixed mirror 140, the angle of incidence of reference beam 72 on second beam-splitting surface 123 is less than 45° so that second beam-splitting surface 123 reflects ghost reference beam 82 at an angle of reflection that is also less than 45°. Ghost reference beam 82 passes through quarter-wave plate 54 and is incident at a non-zero angle of incidence at a location S on the reflective surface 52 of movable mirror 50. Reflective surface 52 reflects ghost reference beam 82 back towards DPBS 120 along a non-reciprocal path that is neither parallel nor orthogonal to incident beam 62.

After reflection once by fixed mirror 140 and once by movable mirror 50, ghost reference beam 82 passes back through quarter-wave plate 54. The second pass through quarter-wave plate 54 changes ghost reference beam 82 from s-polarized to p-polarized. Ghost reference beam 82 is incident at a location T on second beam-splitting surface 123. Location T is spatially offset from locations O and Q, described above. Second beam-splitting surface 123 transmits ghost reference beam 82 towards first beam-splitting surface 122. Ghost reference beam 82 is incident at a location t on first beam-splitting surface 122. First beam-splitting surface 122 transmits ghost reference beam 82 towards sensor 70. After transmission by first beam-splitting surface 122, ghost reference beam 82 emerges from DPBS 120, and is incident on sensor 70 at a location U.

As a result of the reflective surface 142 of fixed mirror 140 being tilted, the angle of incidence of reference beam 72 on second beam-splitting surface 123 is less than 45°. Consequently, the angle of reflection of ghost reference beam 82 is less than 45° and ghost reference beam 82 is incident on the reflective surface 52 of movable mirror 50 with a non-zero angle of incidence. After reflection by reflective surface 52 and transmission by second beam-splitting surface 123 and first beam-splitting surface 122, ghost reference beam 82 emerges from DPBS 120 with its beam axis diverging from the beam axes of desired beams 72, 74, and with its beam axis spatially offset from the beam axes of the desired beams.

As noted above, after reflection once by movable mirror 50, measurement beam 74 is incident at location O on the second beam-splitting surface 123 of DPBS 120 with a direction of incidence orthogonal to the direction of incident light beam 62. Second beam-splitting surface 123 transmits an unwanted p-polarized component of the measurement beam towards first beam-splitting surface 122 as ghost measurement beam 84. Ghost measurement beam 84 in incident at a location on first beam-splitting surface 122. First beam-splitting surface 122 transmits ghost measurement beam 84 towards fixed mirror 140 in a direction orthogonal to incident light beam 62. Ghost measurement beam 84 passes through quarter-wave plate 44 and is incident at a location V on the reflective surface 142 of fixed mirror 140. Due to the tilt of reflective surface 142, ghost measurement beam 84 is incident on reflective surface 142 at a non-zero angle of incidence. Reflective surface 142 reflects the ghost measurement beam back towards DPBS 120 along a non-reciprocal path that is neither parallel nor orthogonal to incident beam 62.

After reflection once by fixed mirror 140 and once by movable mirror 50, ghost measurement beam 84 passes once more through quarter-wave plate 44. The second pass through quarter-wave plate 44 changes ghost measurement beam 84 from p-polarized to s-polarized. Ghost measurement beam 84 is incident at a location w on first beam-splitting surface 122 of DPBS 120. Location w is spatially offset from location o, described above. The angle of incidence of ghost measurement beam 84 on first beam-splitting surface 122 is less than 45°, so that first beam-splitting surface 122 reflects ghost measurement beam 74 towards sensor 70 with an angle of reflection that is less than 45°. After reflection by first beam-splitting surface 122, ghost measurement beam 84 emerges from DPBS 120 and is incident on sensor 70 at a location X.

As a result of the tilt of reflective surface 142, ghost measurement beam 84 emerges from DPBS 120 with its beam axis diverging from the beam axes of desired beams 72, 74, and with its beam axis spatially offset from the beam axes of the desired beams.

The beam axes of ghost beams 82, 84 diverging from those of desired beams 72, 74 as the beams are incident on sensor 70 is sufficient to reduce interference between ghost beams 82, 84 and desired beams 72, 74 even when there is some spatial overlap between the ghost beams and the desired beams. However, the beam axes of the ghost beams diverging from those of the desired beams typically additionally reduces beam overlap between the ghost beams and the desired beams. In this regard, it should be noted that the beam overlap between ghost beams 82, 84 and desired beams 72, 74 at sensor 70 varies depending on the distance between movable mirror 50 and DPBS 120.

Figure 4A:
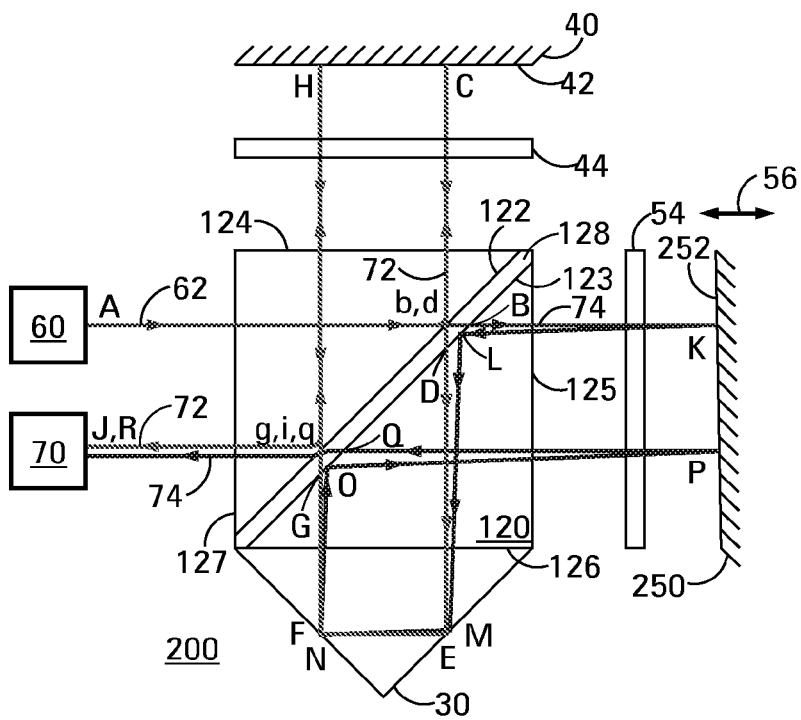
FIG. 4A is a schematic drawing showing an example of an interferometer in accordance with another embodiment of the invention in which the movable mirror is physically tilted in its entirety.
Figure 4B:
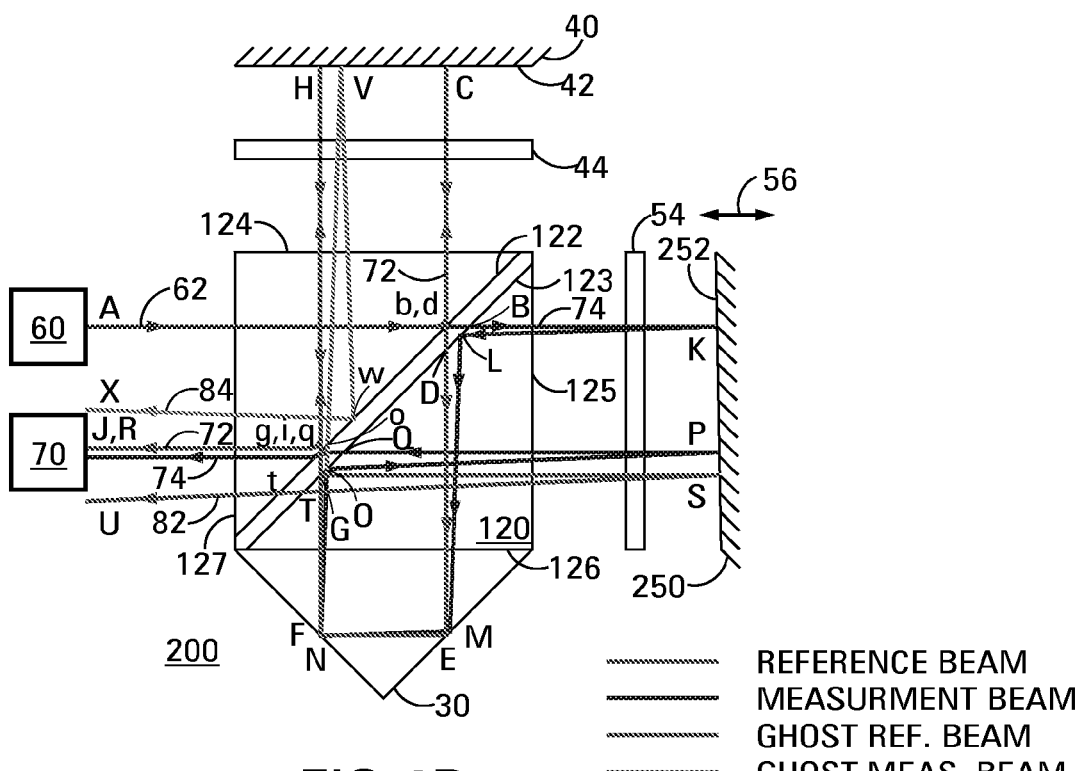
FIG. 4B is a schematic drawing showing examples of the ghost beams to which the interferometer shown in FIG. 4A is subject.

FIGS. 4A and 4B are schematic drawings showing an example of an interferometer 200 in accordance with an embodiment of the invention. Interferometer 200 is structurally similar to interferometer 100 described above with reference to FIGS. 3A-3C, except that, in interferometer 200, the movable mirror is tilted instead of the fixed mirror. Specifically, the entire movable mirror is physically tilted in this embodiment. In interferometer 200, the tilt of the movable mirror imposes a spatial offset on the measurement beam that depends on the distance between the movable mirror and the DPBS. The separation distance between the first beam-splitting surface and the second beam-splitting surface of the DPBS is set such that the first beam-splitting surface imposes a spatial offset on the position at which the reference beam emerges from DPBS 120 nominally equal to the spatial offset that the tilt of the movable mirror imposes on the position at which the measurement beam emerges at one specific distance of the movable mirror from the DPBS. At other distances, the distance-dependent walk-off of the measurement beam introduces a small spatial offset between the reference beam and the measurement beam.

Interferometer 200 is composed of double polarizing beam splitter (DPBS) 120, retroreflector 30, fixed plane mirror 40, a movable plane mirror 250, quarter-wave plate 44 and quarter-wave plate 54. Fixed mirror 40 is in a fixed location relative to DPBS 120 and has a plane reflective surface 42. Reflective surface 42 has a nominal orientation. Movable mirror 250 is affixed to a body (not shown) whose displacement is to be measured using interferometer 200 and has a plane reflective surface 252. The reflective surface 252 of movable mirror 250 has a nominal orientation orthogonal to the nominal orientation of the reflective surface 42 of fixed mirror 40 and to the direction of motion 56 of movable mirror 250.

The remaining elements of interferometer 200 and their arrangement are identical to corresponding elements of interferometer 100 described above with reference to FIGS. 3A-3C and will therefore not be described again here.

In the example shown in FIG. 4A, DPBS 120 is embodied as a double beam-splitting cube. DPBS 120 may alternatively be embodied as a parallel-sided slab as described above with reference to FIG. 3B.

In interferometer 200, the entire reflective surface 252 of movable mirror 250 is physically tilted relative to its nominal orientation, and each of the reflective surface 42 of fixed mirror 40 and the first beam-splitting surface 122 and the second beam-splitting surface 123 of DPBS 120 is oriented at its respective nominal orientation. Optionally, at least part of one or more of reflective surface 42, first beam-splitting surface 122 and second beam-splitting surface 123 is additionally tilted relative to its respective nominal orientation. Each surface that is tilted relative to its nominal orientation reflects light having a direction of incidence parallel or orthogonal to a normal to the nominal orientation of the reflective surface 42 of fixed mirror 40 in a direction of reflection neither parallel nor orthogonal to the direction of incidence.

The tilt of the reflective surface 252 of movable mirror 250. i.e., the angle between the actual orientation of reflective surface 252 and the nominal orientation of reflective surface 252, is set such that, at the minimum distance of movable mirror 250 from DPBS 120, each ghost beam is angularly separated from desired light beams 72, 74 by a respective separation angle greater than a minimum separation angle. The minimum separation angle is that which ensures that the level of any unwanted signal component generated by sensor 70 in response to interference between ghost beams and desired beams 72, 74 is below an acceptable threshold level. Furthermore, the tilt of reflective surface 252 is set such that the separation angle remains greater than the minimum separation angle over the entire range of movement of the movable body (not shown) to which movable mirror 250 is affixed. The tilt of reflective surface is set such that the separation angle remains greater than the minimum separation angle over the entire range of the above-described rotation to which the orientation of movable mirror 250 is subject.

The separation distance between the second beam-splitting surface 123 and the first beam-splitting surface 122 of DPBS 120 is set such that, at a nominal distance of movable mirror 250 from DPBS 120, first beam-splitting surface 122 imposes a spatial offset on the position at which reference beam 72 emerges from DPBS 120 nominally equal to the spatial offset imposed on measurement beam 74 by the tilt of the movable mirror 250. Thus, with movable mirror 250 at the nominal distance from DPBS 120, the beam axes of the measurement beam and the reference beam are parallel and collinear, and interference between desired beams 72, 74 is maximized. With movable mirror 250 at a distance from DPBS 120 different from the nominal distance, a small spatial offset exists between reference beam 72 and measurement beam 74 because the spatial offset imposed on measurement beam 74 by the tilt of movable mirror 250 depends on the distance of movable mirror 250 from DPBS 120, whereas the spatial offset imposed on reference beam 72 is independent of the distance. The magnitude of the spatial offset between desired beams 72, 74 reaches a maximum at the maximum and minimum distances of movable mirror 250 from DPBS 120. The maximum magnitude of the spatial offset is a small-enough fraction of the beam diameters of the desired beams that it is insufficient to degrade the signal-to-noise ratio of the desired interference component in the output signal generated by sensor 70 to less than a defined threshold.

Operation of the example of interferometer 200 shown in FIG. 4A will now be described. Incident beam 62 is emitted by light source 60 at location A and is incident at a location b on the first beam-splitting surface 122 of DPBS 120. The s-polarized component of incident beam 62 is reflected by first beam-splitting surface 122 and constitutes reference beam 72. Reference beam 72 passes through quarter-wave plate 44 and is incident at a zero angle of incidence at a location C on the reflective surface 42 of fixed mirror 40. Reflective surface 42 reflects reference beam 72 back towards DPBS 120 along a reciprocal path.

After the first reflection by fixed mirror 40, reference beam 72 passes back through quarter-wave plate 44. Two passes through quarter-wave plate 44 change reference beam 72 from s-polarized to p-polarized. Reference beam 72 is incident at a location d on first beam-splitting surface 122. Location d is coincident with location b, described above. First beam-splitting surface 122 transmits the reference beam towards second beam-splitting surface 123. Reference beam 72 is incident a location D on second beam-splitting surface 123. Second beam-splitting surface 123 transmits the reference beam towards retroreflector 30.

Retroreflector 30 reflects reference beam 72 at locations E and F, after which the reference beam passes back into DPBS 120 along a path that is parallel to, but offset from, the path of the reference beam between locations D and E.

Reference beam 72 is again incident on the second beam-splitting surface 123 of DPBS 120, this time at a location G. Second beam-splitting surface 123 transmits reference beam 72 towards first beam-splitting surface 122. Reference beam 72 in incident at a location g on second beam-splitting surface 123. First beam-splitting surface 122 transmits the reference beam towards fixed mirror 40. Reference beam 72 passes once more through quarter-wave plate 44, and is incident at a zero angle of incidence at a location H on the reflective surface 42 of fixed mirror 40. Reflective surface 42 reflects reference beam 72 back towards DPBS 120 along a reciprocal path.

After the second reflection by fixed mirror 40, reference beam 72 passes back through quarter-wave plate 44. The final pass through quarter-wave plate 44 restores reference beam 72 to s-polarized. Reference beam 72 is incident at a location i on the first beam-splitting surface 122 of DPBS 120. Location i is coincident with location g, described above. First beam-splitting surface 122 reflects reference beam 72 towards sensor 70. After reflection, the reference beam emerges from DPBS 120 in a direction parallel to incident beam 62, and is incident on sensor 70 at a location J.

The p-polarized component of incident beam 62 is also incident at location b on the first beam-splitting surface 122 of DPBS 120. The first beam-splitting surface transmits the p-polarized component of incident beam 62 towards a location B on the second beam-splitting surface 123 of DPBS 120 as measurement beam 74. Second beam-splitting surface 123 transmits measurement beam 74 towards movable mirror 250. Measurement beam 74 passes through quarter-wave plate 54 and is incident at a location K on the reflective surface 252 of movable mirror 250. Due to the tilt of reflective surface 252, measurement beam 74 is incident at a non-zero angle of incidence. Consequently, reflective surface 252 reflects measurement beam 74 back towards DPBS 120 along a non-reciprocal path that is neither parallel nor orthogonal to incident beam 62.

After the first reflection by movable mirror 250, measurement beam 74 passes back through quarter-wave plate 54. Two passes through quarter-wave plate 54 change measurement beam 74 from p-polarized to s-polarized. Measurement beam is incident at a location L on second beam-splitting surface 123. Location L is spatially offset from location B, described above. Second beam-splitting surface 123 reflects measurement beam 74 towards retroreflector 30.

Retroreflector 30 reflects measurement beam 74 at locations M and N, after which the measurement beam passes back into DPBS 120 along a path that is parallel to, but offset from, the path of the measurement beam between locations L and M.

Measurement beam 74 is again incident on the second beam-splitting surface 123 of DPBS 120, this time at a location O. Location O is spatially offset from location G, where reference beam 72 is incident on second beam-splitting surface 123. Second beam-splitting surface 123 reflects measurement beam 74 towards movable mirror 250. Measurement beam 74 passes through quarter-wave plate 54 and is incident at a location P on the reflective surface 252 of movable mirror 250. Due to the tilt of reflective surface 252, measurement beam 74 is incident at a non-zero angle of incidence. Consequently, reflective surface 252 reflects measurement beam 74 back towards DPBS 120 along a non-reciprocal path that is parallel to the direction of incident beam 62.

After the second reflection by movable mirror 250, measurement beam 74 passes back through quarter-wave plate 54. The final pass through quarter-wave plate 54 restores measurement beam 74 to p-polarized. Measurement beam 74 is incident at a location Q on the second beam-splitting surface 123 of DPBS 120. Location Q is spatially offset from location O, described above. Second beam-splitting surface 123 transmits measurement beam 74 towards first beam-splitting surface 122. Measurement beam 74 is incident at a location q on first beam-splitting surface 122. Location q is nominally coincident with locations g and i, described above. First beam-splitting surface 122 transmits measurement beam 74 towards sensor 70.

After transmission by first beam-splitting surface 122, measurement beam 74 emerges from DPBS 120 and is incident on sensor 70 at a location R. In a manner similar to that described above, sensor 70 electrically detects the superposed light beams 72 and 74 to generate an electrical signal that includes a desired interference component that represents the interference between light beams 72 and 74.

In the example shown, movable mirror 250 is located at its nominal distance from DPBS 120 and the spacing between first beam-splitting surface 122 and second beam-splitting surface 123 is that which imposes on reference beam 72 a spatial offset equal to the spatial offset imposed on measurement beam 74 by the tilt of reflective surface 252. Consequently, in the example shown, reference beam 72 and measurement beam 74 are nominally superposed, and the beam axes of reference beam 72 and measurement beam 74 are parallel and coincident. At other distances of movable mirror 250 from DPBS 120, the beam axes of reference beam 72 and measurement beam 74 remain parallel. However, the beam axes are spatially offset but the beams nevertheless overlap and therefore interfere.

The elements of interferometer 200 are subject to defects similar to those described above so that interferometer 200 is subject to ghost beams. FIG. 4B is a schematic diagram showing the paths of exemplary ghost beams, i.e., ghost reference beam 82 and ghost measurement beam 84, in interferometer 200. The paths of reference beam 72 and measurement beam 74, i.e., desired beams 72, 74, shown in FIG. 4B are the same as those described above with reference to FIG. 4A.

As noted above, after reflection once by fixed mirror 140, reference beam 72 is incident at location G on the second beam-splitting surface 123 of DPBS 120. Second beam-splitting surface 123 reflects an unwanted s-polarized component of reference beam 72 towards movable mirror 250 as ghost reference beam 82. Because neither the reflective surface 42 of fixed mirror 40 nor the first beam-splitting surface 122 of DPBS 120 is tilted, ghost reference beam 82 travels in a direction parallel to incident beam 62. Ghost reference beam 82 passes through quarter-wave plate 52 and is incident at a location S on the reflective surface 252 of movable mirror 250. Due to the tilt of reflective surface 252, ghost reference beam 82 is incident at a non-zero angle of incidence. Reflective surface 252 reflects ghost reference beam 82 back towards DPBS 120 along an non-reciprocal path that is neither parallel nor orthogonal to incident beam 62.

After reflection once by fixed mirror 40 and once by movable mirror 250, ghost reference beam 82 passes back through quarter-wave plate 54. The second pass through quarter-wave plate 54 changes ghost reference beam 82 from s-polarized to p-polarized. Ghost reference beam 82 is incident at a location T on second beam-splitting surface 123. Location T is spatially offset from location O, described above. Second beam-splitting surface 123 transmits ghost reference beam 82 towards first beam-splitting surface 122. Ghost reference beam 82 is incident at a location t on first beam-splitting surface 122. First beam-splitting surface 122 transmits ghost reference beam 82 towards sensor 70. After transmission by first beam-splitting surface 122, ghost reference beam 82 emerges from DPBS 120, and is incident on sensor 70 at U.

As a result of movable mirror 250 being tilted, ghost reference beam 82 returns to second beam-splitting surface 123 along a non-reciprocal path that is spatially offset from and diverges from the path of measurement beam 74. Consequently, ghost reference beam 82 emerges from DPBS 120 with its beam axis diverging from the beam axes of desired beams 72, 74, and with its beam axis spatially offset from the beam axes of the desired beams.

As noted above, after reflection once by movable mirror 250, measurement beam 74 is incident at location O on the second beam-splitting surface 123 of DPBS 120. Due to the tilt of movable mirror 250, the direction of incidence of measurement beam 74 on second beam-splitting surface 123 is neither parallel nor orthogonal to the direction of incident beam 62. Second beam-splitting surface 123 transmits an unwanted p-polarized component of measurement beam 74 towards first beam-splitting surface 122 as ghost measurement beam 84. Ghost measurement beam 84 travels in a direction that is neither parallel nor orthogonal to incident beam 62. Ghost measurement beam 84 is incident at a location o on first beam-splitting surface 122. First beam-splitting surface 122 transmits ghost measurement beam 84 towards fixed mirror 40. Ghost measurement beam 84 passes through quarter-wave plate 42 and is incident at a non-zero angle of incidence at a location V on the reflective surface 42 of fixed mirror 40. Reflective surface 42 reflects ghost measurement beam 84 back towards DPBS 120 along a non-reciprocal path that is neither parallel nor orthogonal to incident beam 62.

After reflection once by fixed mirror 40 and once by movable mirror 250, ghost measurement beam 84 passes back through quarter-wave plate 44. The second pass through quarter-wave plate 44 changes ghost measurement beam 84 from p-polarized to s-polarized. Ghost measurement beam 84 is incident at a location w on the first beam-splitting surface 122 of DPBS 120. Location w is spatially offset from locations g, i and q, described above. The angle of incidence of ghost measurement beam 84 on first beam-splitting surface 122 is less than 45°, so that first beam-splitting surface 122 reflects the ghost measurement beam towards sensor 70 with an angle of reflection that is less than 45°. After reflection by first beam-splitting surface 122, ghost measurement beam 84 emerges from DPBS 120, and is incident on sensor 70 at a location X.

As a result of the tilt of movable mirror 250, ghost measurement beam 84 emerges from DPBS 120 with its beam axis diverging from the beam axes of desired beams 72, 74, and with its beam axis spatially offset from the beam axes of the desired beams.

The beam axes of ghost beams 82, 84 diverging from those of desired beams 72, 74 as the beams are incident on sensor 70 is sufficient to reduce interference between ghost beams 82, 84 and desired beams 72, 74 even when there is some spatial overlap between the ghost beams and the desired beams. However, the beam axes of the ghost beams diverging from those of the desired beams typically additionally reduces beam overlap between the ghost beams and the desired beams. In this regard, it should be noted that the beam overlap between the ghost beams 82, 84 and desired beams 72, 74 at sensor 70 varies depending on the distance between movable mirror 250 and DPBS 120.

Figure 5A:
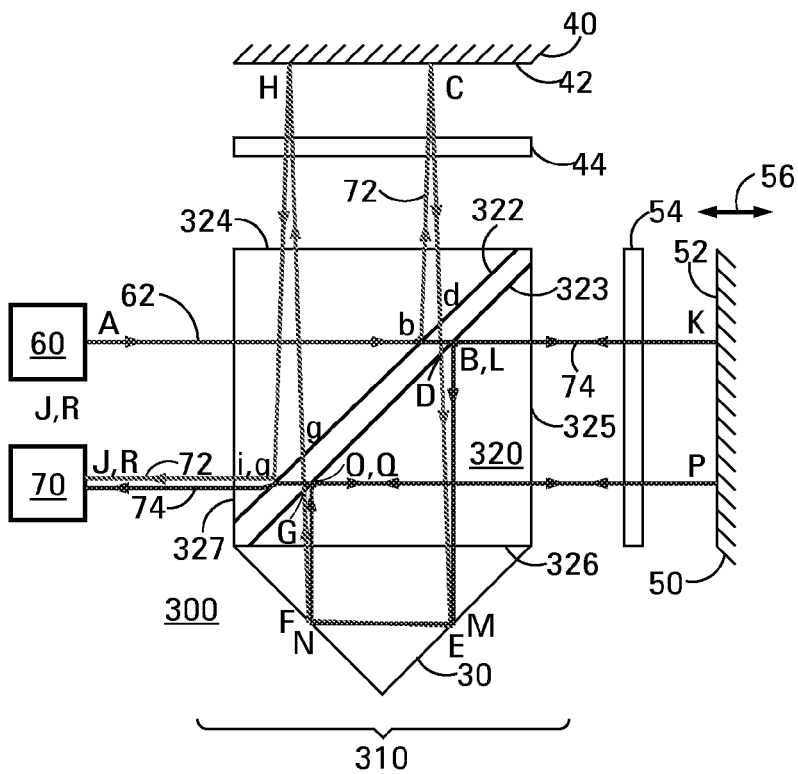
FIG. 5A is a schematic drawing showing an example of an interferometer in accordance with an embodiment of the invention in which the first beam-splitting surface of the double polarizing beam splitter is physically tilted in its entirety.

FIG. 5A is a schematic drawing showing an example of an interferometer 300 in accordance with another embodiment of the invention. Interferometer 300 is structurally similar to interferometer 100 described above with reference to FIG. 3A, except that, in interferometer 300, the first beam-splitting surface of the double polarizing beam-splitter (DPBS) is tilted. In the example shown, neither the movable mirror nor the fixed mirror is tilted.

Interferometer 300 is composed of a double polarizing beam splitter (DPBS) 320, retroreflector 30, fixed plane mirror 40, movable plane mirror 50, quarter-wave plate 44 and quarter-wave plate 54. Fixed mirror 40 is in a fixed location relative to DPBS 320 and has a plane reflective surface 42. Reflective surface 42 has a nominal orientation. Movable mirror 50 is affixed to a body (not shown) whose displacement is to be measured using interferometer 300 and has a plane reflective surface 52. Reflective surface 52 has a nominal orientation orthogonal to the nominal orientation of the reflective surface 42 of fixed mirror 40 and to the direction of motion 56 of movable mirror 50.

DPBS 320 has a first beam-splitting surface 322 and a second beam-splitting surface 323. Each of the beam-splitting surfaces 322, 323 of DPBS 320 reflects s-polarized light and transmits p-polarized light. Second beam-splitting surface 323 is spatially offset from first beam-splitting surface 322 by a predetermined separation distance. In this embodiment, beam-splitting surfaces 322, 323 each have a nominal orientation with respect to the nominal orientation of the reflective surface 42 of fixed mirror 40. In the example shown, the nominal orientation of each of the beam-splitting surfaces 322, 323 is at 45° with respect to the nominal orientation of fixed mirror 42. Other nominal orientations are possible, as noted above.

In interferometer 300, the first beam-splitting surface 322 of DPBS 320 is tilted relative to its nominal orientation, and each of the reflective surface 42 of fixed mirror 40, the reflective surface 52 of movable mirror 50 and the second beam-splitting surface 323 of DPBS 320 is oriented at its respective nominal orientation. Optionally, at least part of one or more of reflective surface 42, reflective surface 52 and second beam-splitting surface 323 is additionally tilted relative to its respective nominal orientation. Each surface that is tilted relative to its nominal orientation reflects light having a direction of incidence parallel or orthogonal to a normal to the nominal orientation of the reflective surface 42 of fixed mirror 40 in a direction of reflection neither parallel nor orthogonal to the direction of incidence.

DPBS 320 is located such that a normal (not shown) to the reflective surface 42 of fixed mirror 40 intersects with a normal (not shown) to the reflective surface 52 of movable mirror 50 within the DPBS. DPBS 320 is oriented such that first beam-splitting surface 322 faces fixed mirror 40 and second beam-splitting surface 323 faces movable mirror 52, and second beam-splitting surface 323 is at its nominal orientation with respect to reflective surface 42, as described above.

In the example shown in FIG. 5A, DPBS 320 is embodied as a double beam-splitting cube that has plane cube surfaces 324, 325, 326 and 327 in clockwise order. Cube surface 324 faces fixed mirror 40. Opposed cube surfaces 324 and 326 are oriented at 45° relative to second beam-splitting surface 323. Opposed cube surfaces 325 and 327 are orthogonal to cube surfaces 324 and 326.

Figure 5B:
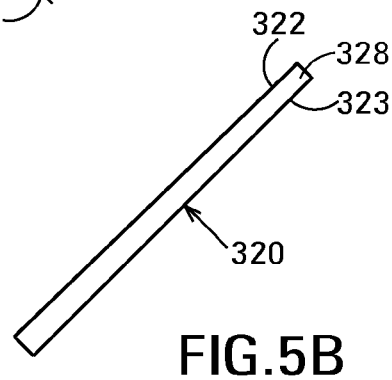
FIG. 5B is a schematic drawing showing another example of the double polarizing beam splitter that constitutes part of the interferometer shown in FIG. 5A.

FIG. 5B is a schematic drawing showing another example of DPBS 320. In this example, DPBS 320 is composed of a slab 328 of a transparent material, such as glass. Layers (not separately shown) of a polarizing beam-splitting material are deposited on the opposed major surfaces of slab 328 to provide beam-splitting surfaces 322 and 323. The surfaces of slab 328 are not parallel, so that first beam-splitting surface 322 is tilted relative to second beam-splitting surface 323. The slab is mounted with second beam-splitting surface 323 at its nominal orientation with respect to the nominal orientation of the reflective surface 42 of fixed mirror 40.

Referring again to FIG. 5A, the remaining elements of interferometer 300 and their arrangement are identical to corresponding elements of interferometer 100 described above with reference to FIGS. 3A and 3B and will therefore not be described again here.

In the example shown in FIG. 5A, DPBS 320, quarter-wave plates 44 and 54 and fixed mirror 40 are shown as separate components to enable these components to be shown clearly. In embodiments in which DPBS 320 is embodied as a double beam-splitting cube, also as shown in FIG. 5A, quarter-wave plates 44 and 54 may be affixed to cube surfaces 324 and 325, respectively, of DPBS 320. Fixed mirror 40 may implemented as a layer of reflective material deposited on the surface of quarter-wave plate 44 remote from DPBS 320. Also, retroreflector 30 is shown affixed to the cube surface 326 of DPBS 320, but may alternatively be spaced from cube surface 326. In another example, DPBS 320 is implemented as a double beam-splitting cube, and the prism that provides the cube surface 326 of DPBS 320 and retroreflector 30 are fabricated from the same piece of optical material as a single optical element.

Regardless of whether two or more of DPBS 320, quarter-wave plates 44 and 54, retroreflector 30 and fixed mirror 40 are affixed to one another, DPBS 320, quarter-wave plates 44 and 54, retroreflector 30 and fixed mirror 40 arranged as described above collectively constitute an optical assembly 310 in accordance with an embodiment of the invention. An interferometer similar to interferometer 300 for measuring the displacement of a body (not shown) can be conveniently fabricated using such optical assembly 310 together with a suitable light source and detector, and a movable mirror mounted on the body.

In DPBS 320, the tilt of first beam-splitting surface 322, i.e., the angle between the orientation of first beam-splitting surface 322 and the nominal orientation of first beam-splitting surface 322 parallel to second beam-splitting surface 323, is set such that each ghost beam that emerges from DPBS 320 is angularly separated from desired beams 72, 74 by a respective separation angle greater than a minimum separation angle. The minimum separation angle is that which ensures that the level of any unwanted interference component generated by sensor 70 in response to interference between the ghost beams and the desired beams 72, 74 is below an acceptable threshold level. Furthermore, the tilt of first beam-splitting surface 322 is set such that the separation angle remains greater than the minimum separation angle over the entire range of movement of the movable body (not shown) to which movable mirror 50 is affixed. The tilt of first beam-splitting surface 322 is typically additionally set such that the separation angle remains greater than the minimum separation angle over the entire range of the above-described rotation to which the orientation of movable mirror 50 is subject.

The separation distance between first beam-splitting surface 322 and second beam-splitting surface 323 is set such that second beam-splitting surface 323 imposes a spatial offset on the position at which measurement beam 74 emerges from DPBS 320 nominally equal to the spatial offset imposed by the tilt of first beam-splitting surface 322 on the position at which reference beam 72 emerges. This makes the beam axes of reference beam 72 and measurement beam 74 collinear, which maximizes the amplitude of desired interference component generated by sensor 70 in response to interference between desired beams 72, 74. The spatial offsets in the positions at which reference beam 72 and measurement beam 74 emerge from DPBS 320 are independent of the distance of movable mirror 50 from DPBS 320 in this embodiment, so that maximum interference between the desired beams is maintained over the full range of the linear motion of the movable mirror.

Operation of the example of interferometer 300 shown in FIG. 5A will now be described. Incident beam 62 is emitted by light source 60 at a location A and is incident at a location b on the first beam-splitting surface 322 of DPBS 320. The s-polarized component of incident beam 62 is reflected by first beam-splitting surface 322 and constitutes reference beam 72. Due to the tilt of first beam-splitting surface 322, the first beam-splitting surface reflects reference beam 72 in a direction of reflection that is neither parallel nor orthogonal to incident beam 62. Reference beam 72 passes through quarter-wave plate 42 and is incident at a location C on the reflective surface 42 of fixed mirror 40. Due to the tilt of first beam-splitting surface 322, reference beam 72 is incident at a non-zero angle of incidence. Reflective surface 42 reflects reference beam 72 back towards DPBS 320 along a non-reciprocal path that is neither parallel nor orthogonal to incident beam 62.

After the first reflection by fixed mirror 40, reference beam 72 passes back through quarter-wave plate 44. Two passes through quarter-wave plate 44 change reference beam 72 from s-polarized to p-polarized. Reference beam 72 is incident at a location d on first beam-splitting surface 322. Location d is spatially offset from location b, described above. First beam-splitting surface 322 transmits the reference beam towards second beam-splitting surface 323. Reference beam 72 is incident at a location D on second beam-splitting surface 323. Second beam-splitting surface 323 transmits the reference beam towards retroreflector 30.

Retroreflector 30 reflects reference beam 72 at locations E and F, after which the reference beam passes back into DPBS 320 along a path that is parallel to, but offset from, the path of the reference beam between locations D and E.

Reference beam 72 is again incident on the second beam-splitting surface 323 of DPBS 320, this time at a location G. Second beam-splitting surface 323 transmits reference beam 72 towards first beam-splitting surface 332. Reference beam 72 is incident at a location g on first beam-splitting surface 332. First beam-splitting surface 332 transmits the reference beam towards fixed mirror 40. Reference beam 72 passes once more through quarter-wave plate 44, and is incident at a location H on the reflective surface 42 of fixed mirror 40. Due to the tilt of first beam-splitting surface 322, reference beam 72 is incident at a non-zero angle of incidence. Consequently, reflective surface 42 reflects reference beam 72 back towards DPBS 320 along a non-reciprocal path that is neither parallel nor orthogonal to incident beam 62.

After the second reflection by fixed mirror 40, reference beam 72 passes back through quarter-wave plate 44. The final pass through quarter-wave plate 44 restores reference beam 72 to s-polarized. Reference beam 72 is incident at a location i on the first beam-splitting surface 322 of DPBS 320. Location i is spatially offset from location g, described above. First beam-splitting surface 322 reflects reference beam 72. The angle of incidence of reference beam 72 on first beam-splitting surface 322 is greater than 45°, so that first beam-splitting surface 322 reflects the reference beam towards sensor 70 with an angle of reflection that is greater than 45°. After reflection by first beam-splitting surface 322, reference beam 72 emerges from DPBS 320 in a direction parallel to incident beam 62 and is incident on sensor 70 at a location J.

The p-polarized component of incident beam 62 is also incident at location b on the first beam-splitting surface 322 of DPBS 320. The first beam-splitting surface transmits the p-polarized component of incident beam 62 towards a location B on the second beam-splitting surface 323 of DPBS 320 as measurement beam 74. Since none of the surfaces that reflect measurement beam 74 is tilted, the path of measurement beam 74 in interferometer 300 is the same as that of measurement beam 74 in interferometer 100 described above with reference to FIG. 3A, and will not be described in detail here.

Measurement beam 74 emerges from DPBS 320 and is incident on sensor 70 at a location R. In a manner similar to that described above, sensor 70 electrically detects the superposed light beams 72 and 74 to generate an electrical signal that includes a desired interference component that represents the interference between light beams 72 and 74.

Location R is coincident with location J. Measurement beam 74 is nominally superposed with reference beam 72, and the beam axes of reference beam 72 and measurement beam 74 are parallel and coincident. Note that if the separation between the first beam-splitting surface 322 and second beam-splitting surface 323 does not impose a walk-off on the measurement beam equal to the walk-off imposed on the reference beam by the tilt of first beam-splitting surface 322, the beam axes remain parallel, but are spatially offset from one another.

Figure 5C:
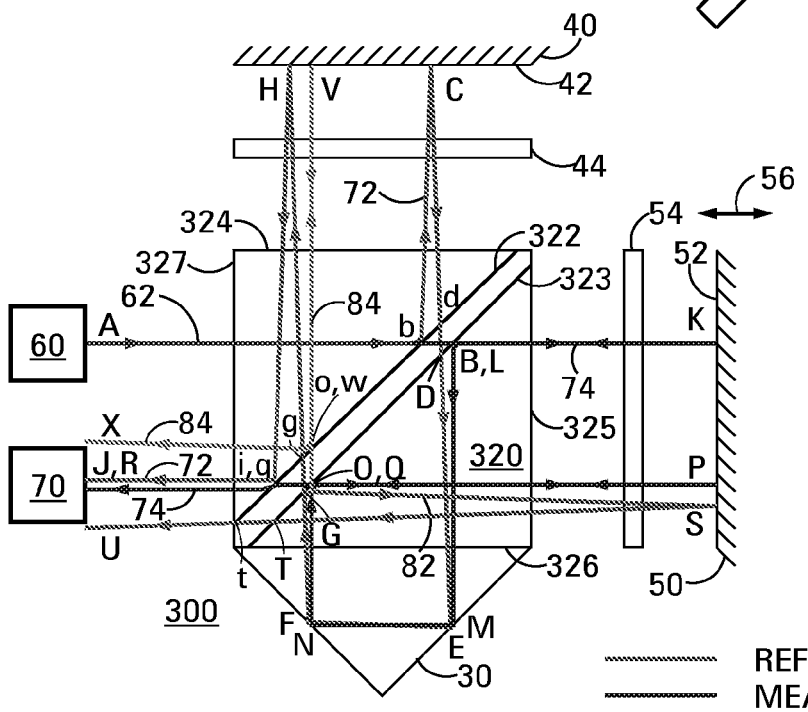
FIG. 5C is a schematic drawing showing examples of the ghost beams to which the interferometer shown in FIG. 5A is subject.

The elements of interferometer 300 are subject to defects similar to those described above, so that interferometer 300 is subject to ghost beams. FIG. 5C is a schematic diagram that additionally shows the paths of exemplary ghost beams, i.e., ghost reference beam 82 and ghost measurement beam 84, in interferometer 300. The paths of reference beam 72 and measurement beam 74, i.e., desired beams 72, 74, shown in FIG. 5C are the same as those described above with reference to FIG. 5A.

As noted above, after reflection once by fixed mirror 40, reference beam 72 is incident at location G on the second beam-splitting surface 323 of DPBS 320. Second beam-splitting surface 323 reflects an unwanted s-polarized component of reference beam 72 towards movable mirror 50 as ghost reference beam 82. Due to the tilt of the first beam-splitting surface 322 of DPBS 320, the angle of incidence of reference beam 72 at location G on the second beam-splitting surface 323 of DPBS 320 is less than 45° so that second beam-splitting surface 323 reflects ghost reference beam 82 at an angle of reflection that is also less than 45° so that ghost reference beam 82 travels in a direction neither parallel nor orthogonal to incident beam 62. Ghost reference beam 82 passes through quarter-wave plate 54 and is incident at a non-zero angle of incidence at a location S on the reflective surface 52 of movable mirror 50. Reflective surface 52 reflects ghost reference beam 82 back towards DPBS 320 along a non-reciprocal path that is neither parallel nor orthogonal to incident beam 62.

After reflection once by fixed mirror 40 and once by movable mirror 50, ghost reference beam 82 passes back through quarter-wave plate 54. The second pass through quarter-wave plate 54 changes ghost reference beam 82 from s-polarized to p-polarized. Ghost reference beam 82 is incident at a location T on second beam-splitting surface 323. Location T is spatially offset from locations O and Q, described above. Second beam-splitting surface 323 transmits ghost reference beam 82 towards first beam-splitting surface 322. Ghost reference beam 82 is incident at a location t on first beam-splitting surface 322. First beam-splitting surface 322 transmits ghost reference beam 82 towards sensor 70. After transmission by first beam-splitting surface 322, ghost reference beam 82 emerges from DPBS 320, and is incident on sensor 70 at a location U.

As a result of the first beam-splitting surface 322 of DPBS 320 being tilted, the angle of incidence of reference beam 72 on second beam-splitting surface 323 is less than 45°, and the angle of incidence of ghost reference beam 82 on the reflective surface 52 of movable mirror 50 is greater than zero. Consequently, ghost reference beam 82 emerges from DPBS 320 with its beam axis diverging from the beam axes of desired beams 72, 74, and with its beam axis spatially offset from the beam axes of the desired beams.

As noted above, after reflection once by movable mirror 50, measurement beam 74 is incident at location O on the second beam-splitting surface 323 in a direction orthogonal to the direction of incident light beam 62. Second beam-splitting surface 323 transmits an unwanted p-polarized component of the measurement beam towards first beam-splitting surface 322 as ghost measurement beam 84. Ghost measurement beam 84 is incident at a location o on first beam-splitting surface 322. First beam-splitting surface 322 transmits ghost measurement beam 84 towards fixed mirror 40 in a direction orthogonal to incident light beam 62. Ghost measurement beam 84 passes through quarter-wave plate 44 and is incident at a zero angle of incidence at a location V on the reflective surface 42 of fixed mirror 40. Reflective surface 42 reflects ghost beam 84 back towards DPBS 320 along a reciprocal path.

After reflection once by movable mirror 50 and once by fixed mirror 40, ghost measurement beam 84 passes back through quarter-wave plate 44. The second pass through quarter-wave plate 44 changes ghost measurement beam 84 from p-polarized to s-polarized. Ghost measurement beam 84 is incident at a location w on the first beam-splitting surface 322 of DPBS 320. Location w is coincident with location o, described above. Due to the tilt of first beam-splitting surface 322, the angle of incidence of ghost measurement beam 84 on first beam-splitting surface 322 less than 45° so that first beam-splitting surface 322 reflects ghost measurement beam 84 towards sensor 70 with an angle of reflection that is less than 45°. After reflection by first beam-splitting surface 322, ghost measurement beam 84 emerges from DPBS 320 with its beam axis diverging from the beam axes of desired beams 72, 74, and with its beam axis spatially offset from the beam axes of the desired beams.

The beam axes of ghost beams 82, 84 diverging from those of desired beams 72, 74 as the beams are incident on sensor 70 is sufficient to reduce interference between the ghost beams 82, 84 and desired beams 72, 74 even when there is some spatial overlap between the ghost beams and the desired beams. However, the beam axes of the ghost beams diverging from those of the desired beams typically additionally reduces beam overlap between the ghost beams and the desired beams. In this regard, it should be noted that the beam overlap between ghost beams 82, 84 and desired beams 72, 74 varies depending on the distance between movable mirror 50 and DPBS 320.

FIG. 6A is a schematic drawing showing an example of an interferometer 400 in accordance with another embodiment of the invention. Interferometer 400 is structurally similar to interferometer 100 described above with reference to FIG. 3A, except that, in interferometer 400, the second beam-splitting surface of the double polarizing beam-splitter (DPBS) is tilted. In the example shown, neither the movable mirror nor the fixed mirror is tilted.

Interferometer 400 is composed of a double polarizing beam splitter (DPBS) 420, retroreflector 30, fixed plane mirror 40, movable plane mirror 50, quarter-wave plate 44 and quarter-wave plate 54. Fixed mirror 40 is in a fixed location relative to DPBS 420 and has a plane reflective surface 42. Reflective surface 42 has a nominal orientation. Movable mirror 50 is affixed to a body (not shown) whose displacement is to be measured using interferometer 400 and has a plane reflective surface 52. Reflective surface 52 has a nominal orientation orthogonal to the nominal orientation of the reflective surface 42 of fixed mirror 40 and to the direction of motion 56 of movable mirror 50.

DPBS 420 has a first beam-splitting surface 422 and a second beam-splitting surface 423. Each of the beam-splitting surfaces 422, 423 reflects s-polarized light and transmits p-polarized light. Second beam-splitting surface 423 is spatially offset from first beam-splitting surface 422 by a predetermined separation distance. In the example shown, the nominal orientation of each of the beam-splitting surfaces 422, 423 is at 45° with respect to the reflective surface 42 of fixed mirror 40. Other nominal orientations are possible, as noted above.

In interferometer 400, the second beam-splitting surface 423 of DPBS 420 is tilted relative to its nominal orientation, and each of the reflective surface 42 of movable mirror 40, the reflective surface 52 of movable mirror 50 and the first beam-splitting surface 422 of DPBS 420 is oriented at its respective nominal orientation. Optionally, at least part of one or more of reflective surface 42, reflective surface 52 and first beam-splitting surface 422 is additionally tilted relative to its respective nominal orientation. Each surface that is tilted relative to its nominal orientation reflects light having a direction of incidence parallel or orthogonal to a normal to the nominal orientation of the reflective surface 42 of fixed mirror 40 in a direction of reflection neither parallel nor orthogonal to the direction of incidence.

DPBS 420 is located such that a normal (not shown) to the reflective surface 42 of fixed mirror 40 intersects with a normal (not shown) to the reflective surface 52 of movable mirror 50 within the DPBS. DPBS 420 is oriented such that first beam-splitting surface 422 faces fixed mirror 40 and second beam-splitting surface 423 faces movable mirror 52, and first beam-splitting surface 422 is at its nominal orientation with respect to reflective surface 42, as described above.

In the example shown in FIG. 6A, DPBS 420 is embodied as a double beam-splitting cube that has plane cube surfaces 424, 425, 426 and 427 in clockwise order. Cube surface 424 faces fixed mirror 40. Opposed cube surfaces 424 and 426 are oriented at 45° relative to first beam-splitting surface 422. Opposed cube surfaces 425 and 427 are orthogonal to cube surfaces 424 and 426.

FIG. 6B is a schematic drawing showing another example of DPBS 420. In this example, DPBS 420 is composed of beam-splitting surfaces 422 and 423 on opposite surfaces of a slab 428 of a transparent material, such as glass. Layers (not separately shown) of a polarizing beam-splitting material are deposited on the opposed major surfaces of slab 428 to provide beam-splitting surfaces 422 and 423. The surfaces of slab 428 are not parallel so that second beam-splitting surface 423 is tilted relative to first beam-splitting surface 422. The slab is mounted with first beam-splitting surface 422 at its nominal orientation with respect to the nominal orientation of the reflective surface 42 of fixed mirror 40.

Referring again to FIG. 6A, the remaining elements of interferometer 400 and their arrangement are identical to corresponding elements of interferometer 100 described above with reference to FIGS. 3A and 3B and will therefore not be described again here.

In the example shown in FIG. 6A, DPBS 420, quarter-wave plates 44 and 54 and fixed mirror 40 are shown as separate components to enable these components to be shown clearly. In embodiments in which DPBS 420 is embodied as a double beam-splitting cube, also as shown in FIG. 6A, quarter-wave plates 44 and 54 may be affixed to cube surfaces 424 and 425, respectively, of DPBS 420. Fixed mirror 40 may be implemented as a layer of reflective material deposited on the surface of quarter-wave plate 44 remote from DPBS 420. Also, retroreflector 30 is shown affixed to the cube surface 426 of DPBS 420, but may alternatively be spaced from cube surface 426. In another example, DPBS 420 is implemented as a double beam-splitting cube, and retroreflector 30 and the prism that provides the cube surface 426 of DPBS 420 are fabricated from the same piece of optical material as a single optical element.

Regardless of whether two or more of DPBS 420, quarter-wave plates 44 and 54, retroreflector 30 and fixed mirror 40 are affixed to one another, DPBS 420, quarter-wave plates 44 and 54, retroreflector 30 and fixed mirror 40 arranged as described above collectively constitute an optical assembly 410 in accordance with an embodiment of the invention. An interferometer similar to interferometer 400 for measuring the displacement of a body (not shown) can be conveniently fabricated using such optical assembly 410 together with a suitable light source and detector, and a movable mirror mounted on the body.

In DPBS 420, the tilt of second beam-splitting surface 423, i.e., the angle between the orientation of second beam-splitting surface 423 and the nominal orientation of second beam-splitting surface 423 parallel to first beam-splitting surface 422, is set such that that each ghost beam that emerges from DPBS 420 is angularly separated from desired beams 72, 74 by a respective separation angle greater than a minimum separation angle. The minimum separation angle is that which ensures that the level of any signal component generated by sensor 70 in response to interference between ghost beams and desired beams 72, 74 is below an acceptable threshold level. Furthermore, the tilt of second beam-splitting surface 423 is set such that the separation angle remains greater than the minimum separation angle over the entire range of movement of the movable body (not shown) to which movable mirror 50 is affixed. The tilt of second beam-splitting surface 423 is typically additionally set such that the separation angle remains greater than the minimum separation angle over the entire range of the above-described rotation to which the orientation of movable mirror 50 is subject.

The separation distance between first beam-splitting surface 422 and second beam-splitting surface 423 is set such that first beam-splitting surface 422 imposes a spatial offset on the position at which reference beam 72 emerges from DPBS 420 nominally equal to the spatial offset imposed by the tilt of second beam-splitting surface 423 on the position at which measurement beam 74 emerges. This makes the beam axes of reference beam 72 and measurement beam 74 collinear, which maximizes the amplitude of desired interference component generated by sensor 70 in response to interference between desired beams 72, 74. The spatial offsets in the positions at which reference beam 72 and measurement beam 74 emerge from DPBS 420 are independent of the distance of movable mirror 50 from DPBS 420 in this embodiment, so that maximum interference between the desired beams is maintained over the full range of motion of the movable mirror.

Operation of the example of interferometer 400 shown in FIG. 6A will now be described. Incident beam 62 is emitted by light source 60 at a location A and is incident at a location b on the first beam-splitting surface 422 of DPBS 420. The s-polarized component of incident beam 62 is reflected by first beam-splitting surface 422 and constitutes reference beam 72. Since none of the surfaces that reflect reference beam 72 is tilted, the path of reference beam 72 in interferometer 400 is the same as that of reference beam 72 in interferometer 200 described above with reference to FIG. 4A, and will not be described in detail here. Reference beam 72 emerges from DPBS 420 in a direction parallel to incident beam 62 and is incident on sensor 70 at a location J.

The p-polarized component of incident beam 62 is also incident at location b on the first beam-splitting surface 422 of DPBS 420. The first beam-splitting surface transmits the p-polarized component of incident beam 62 towards a location B on the second beam-splitting surface 423 of DPBS 420 as measurement beam 74. Second beam-splitting surface 423 transmits measurement beam 74 towards movable mirror 50. Measurement beam 74 passes through quarter-wave plate 54 and is incident at a zero angle of incidence at a location K on the reflective surface 52 of movable mirror 50. Reflective surface 52 reflects measurement beam 74 towards DPBS 420 along a reciprocal path.

After the first reflection by movable mirror 50, measurement beam 74 passes once more through quarter-wave plate 54. Two passes through the quarter-wave plate 54 change measurement beam 74 from p-polarized to s-polarized. Measurement beam 74 is incident at a location L on second beam-splitting surface 423. Location L is coincident with location B, described above. Due to the tilt of second beam-splitting surface 423, the angle of incidence of measurement beam 74 on second beam-splitting surface 423 is greater than 45° so that second beam-splitting surface 423 reflects measurement beam 74 with an angle of reflection greater than 45°. Measurement beam 74 travels towards retroreflector 30 in a direction that is neither parallel nor orthogonal to incident light beam 62.

Retroreflector 30 reflects measurement beam 74 at locations M and N, after which the measurement beam passes back into DPBS 420 along a path that is parallel to, but offset from, the path of the measurement beam between locations L and M.

Measurement beam 74 is incident on the second beam-splitting surface 423 of DPBS 420 once more, this time at a location O. Location O is spatially offset from location G, where reference beam 72 is incident on second beam-splitting surface 423. Second beam-splitting surface 423 reflects measurement beam 74 towards movable mirror 50. Due to the tilt of second beam-splitting surface 423, the angle of incidence of measurement beam 74 on second beam-splitting surface 423 is greater than 45°, so that second beam-splitting surface 423 reflects measurement beam 74 with an angle of reflection greater than 45°. Measurement beam 74 travels towards movable mirror 50 in a direction that is once more parallel to incident light beam 62. Measurement beam 74 passes through quarter-wave plate 54 and is incident at a zero angle of incidence at a location P on the reflective surface 52 of movable mirror 50. Reflective surface 52 reflects measurement beam 74 towards DPBS 420 along a reciprocal path.

After the second reflection by fixed mirror 50, measurement beam 74 passes once more through quarter-wave plate 54. The final pass through quarter-wave plate 54 restores measurement beam 74 to p-polarized. Measurement beam 74 is incident at a location Q on the second beam-splitting surface 423 of DPBS 420. Location Q is coincident with location O, described above. Second beam-splitting surface 423 transmits measurement beam 74 towards first beam-splitting surface 422. Measurement beam 74 is incident at a location q on first beam-splitting surface 422. Location q is coincident with locations g and i, described above. First beam-splitting surface 422 transmits measurement beam 74 towards sensor 70.

After transmission by first beam-splitting surface 422, measurement beam 74 emerges from DPBS 420 and is incident on sensor 70 at a location R. In a manner similar to that described above, sensor 70 electrically detects the superposed light beams 72 and 74 to generate an electrical signal that includes a desired interference component that represents interference between desired light beams 72 and 74.

Location R is coincident with location J. Measurement beam 74 is nominally superposed with reference beam 72, and the beam axes of reference beam 72 and measurement beam 74 are parallel and coincident. Note that if the separation between the first beam-splitting surface 422 and second beam-splitting surface 423 does not impose a spatial offset on the reference beam equal to the spatial offset imposed on the measurement beam by the tilt of second beam-splitting surface 423, the beam axes remain parallel, but the beam axes are spatially offset from one another.

The elements of interferometer 400 are subject to defects similar to those described above so that interferometer 400 is subject to ghost beams. FIG. 6C is a schematic diagram that additionally shows the paths of exemplary ghost beams, i.e., ghost reference beam 82 and ghost measurement beam 84, in interferometer 400. The paths of reference beam 72 and measurement beam 74, i.e., desired beams 72, 74, shown in FIG. 6C are the same as those described above with reference to FIG. 6A.

As noted above, after reflection once by fixed mirror 40, reference beam 72 is incident at location G on the second beam-splitting surface 423 of DPBS 420. Second beam-splitting surface 423 reflects an unwanted s-polarized component of reference beam 72 towards movable mirror 50 as ghost reference beam 82. Due to the tilt of second beam-splitting surface 423, the angle of incidence of reference beam 72 on second beam-splitting surface 423 is less than 45° so that second beam-splitting surface 423 reflects ghost reference beam 82 at an angle of reflection that is also less than 45°. After ghost reference beam 82 has passed through quarter-wave plate 54, it is incident at a location S on the reflective surface 52 of movable mirror 50 at a non-zero angle of incidence. Reflective surface 52 reflects ghost reference beam 82 back towards DPBS 420 along a non-reciprocal path.

After reflection once by fixed mirror 40 and once by movable mirror 50, ghost reference beam 82 passes once more through quarter-wave plate 54. The second pass through quarter-wave plate 54 changes ghost reference beam 82 from s-polarized to p-polarized. Ghost reference beam 82 is incident at a location T on second beam-splitting surface 423. Location T is spatially offset from locations O and Q, described above. Second beam-splitting surface 423 transmits ghost reference beam 82 towards first beam-splitting surface 422. Ghost reference beam 82 is incident at a location t on first beam-splitting surface 422. First beam-splitting surface 422 transmits ghost reference beam 82 towards sensor 70. After transmission by first beam-splitting surface 422, ghost reference beam 82 emerges from DPBS 420, and is incident on sensor 70 at a location U.

As a result of the second beam-splitting surface 423 of DPBS 420 being tilted, the angle of incidence of ghost reference beam 82 on the reflective surface 52 of movable mirror 50 is greater than zero. Consequently, after reflection by reflective surface 52 and transmission by second beam-splitting surface 423 and first beam-splitting surface 422, ghost reference beam 82 emerges from DPBS 420 with its beam axis diverging from the beam axes of desired beams 72, 74, and with its beam axis spatially offset from the beam axes of the desired beams.

As noted above, after reflection once by movable mirror 50, measurement beam 74 is incident at location O on the second beam-splitting surface 423 of DPBS 420. Measurement beam 74 has a direction of incidence neither parallel nor orthogonal to the direction of incident light beam 62. Second beam-splitting surface 423 transmits an unwanted p-polarized component of the measurement beam towards first beam-splitting surface 422 as ghost measurement beam 84. Ghost measurement beam 84 is incident at a location o on first beam-splitting surface 422. First beam-splitting surface 422 transmits ghost measurement beam 84 towards fixed mirror 40. Ghost measurement beam 84 passes through quarter-wave plate 44 and is incident at a location V on the reflective surface 42 of fixed mirror 40. Due to the tilt of second beam-splitting surface 423, ghost measurement beam 84 is incident on reflective surface 42 at a non-zero angle of incidence. Consequently, reflective surface 42 reflects ghost beam 84 back towards DPBS 420 along a non-reciprocal path.

After reflection once by movable mirror 50 and once by fixed mirror 40, ghost measurement beam 84 passes back through quarter-wave plate 44. The second pass through quarter-wave plate 44 changes ghost measurement beam 84 from p-polarized to s-polarized. Ghost measurement beam 84 is incident at a location w on the first beam-splitting surface 422 of DPBS 420. Location w is spatially offset from location o, described above. First beam-splitting surface 422 reflects ghost measurement beam 84 towards sensor 70. After reflection by first beam-splitting surface 422, ghost measurement beam 84 emerges from DPBS 420 and is incident on sensor 70 at a location X.

Due to the tilt of second beam-splitting surface 423, ghost measurement beam 84 is incident on first beam-splitting surface 422 at an angle of incidence less than 45° so that first beam-splitting surface 422 reflects ghost measurement beam 84 with an angle of reflection that is less than 45°. After reflection by first beam-splitting surface 422, ghost measurement beam 84 emerges from DPBS 420 with its beam axis diverging from the beam axes of desired beams 72, 74, and with its beam axis spatially offset from the beam axes of the desired beams.

The beam axes of ghost beams 82, 84 diverging from those of desired beams 72, 74 as the beams are incident on sensor 70 is sufficient to reduce interference between ghost beams 82, 84 and desired beams 72, 74 even when there is some spatial overlap between the ghost beams and the desired beams. However, the beam axes of the ghost beams diverging from those of the desired beams typically additionally reduces beam overlap between the ghost beams and the desired beams. In this regard, it should be noted that the beam overlap between ghost reference beam 82 and desired beams 72, 74 varies depending on the distance between movable mirror 50 and DPBS 420.

Figure 7A:
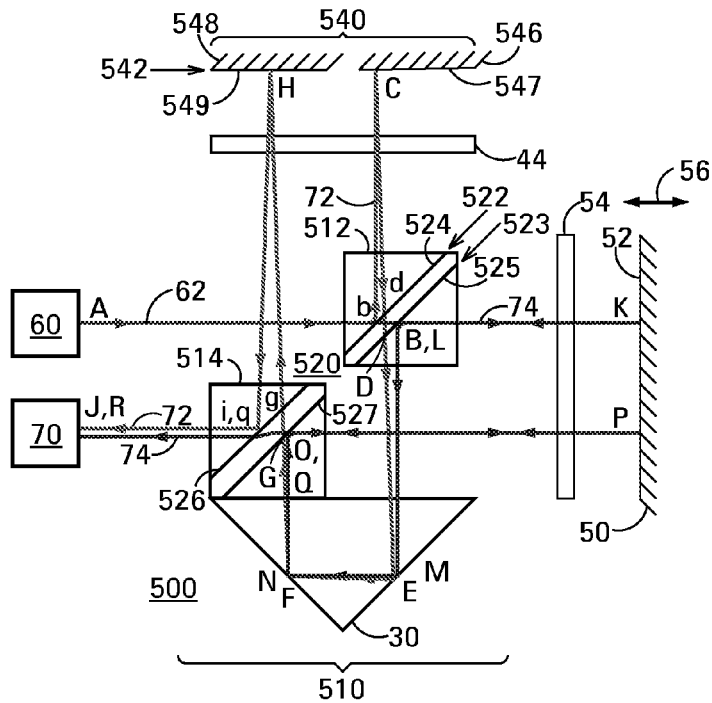
FIG. 7A is a schematic drawing showing an example of an interferometer in accordance with an embodiment of the invention in which part of the reflective surface of the fixed mirror and part of the first beam-splitting surface of the DPBS are physically tilted.

FIG. 7A is a schematic drawing showing an example of an interferometer 500 in accordance with an embodiment of the invention. In interferometer 500, the fixed mirror and the DPBS are each bifurcated such that only part of the reflective surface of the fixed mirror is tilted and only part of the first beam-splitting surface of the DPBS is tilted.

Interferometer 500 is composed of a double polarizing beam splitter (DPBS) 520, retroreflector 30, a fixed plane mirror 540, movable plane mirror 50, quarter-wave plate 44 and quarter-wave plate 54. Fixed mirror 540 is in a fixed location relative to DPBS 520 and has a reflective surface 542. Reflective surface 542 has a nominal orientation. Movable mirror 50 is affixed to a body (not shown) whose displacement is to be measured using interferometer 500 and has a plane reflective surface 52. The reflective surface 52 of movable mirror 50 has a nominal orientation orthogonal to the nominal orientation reflective surface 542 of fixed mirror 540 and to the direction of motion 56 of movable mirror 50. In some applications, the body to which movable mirror 50 is affixed is capable of rotation about one or more axes orthogonal to the direction of motion, as described above.

In this embodiment, fixed mirror 540 is bifurcated and is composed of a first mirror portion 546 and a second mirror portion 548. First mirror portion 546 is located to receive reference beam 72 after the reference beam has been reflected by DPBS 520. Second mirror portion 548 is located to receive reference beam 72 after the reference beam has been transmitted by DPBS 520. The reflective surface 542 of fixed mirror 540 is bifurcated and is composed of a reflective surface portion 547 and a reflective surface portion 549. Reflective surface portion 547 constitutes the reflective surface of the first mirror portion 546 of fixed mirror 540 and is tilted relative to the nominal orientation of reflective surface 542. Reflective surface portion 549 constitutes the reflective surface of the second mirror portion 548 of fixed mirror 540 and is oriented at the nominal orientation of reflective surface 542.

DPBS 520 has a first beam-splitting surface 522 and a second beam-splitting surface 523. Each of the beam-splitting surfaces 522, 523 reflects s-polarized light and transmits p-polarized light. Second beam-splitting surface 523 is spatially offset from first beam-splitting surface 522 by a predetermined separation distance. Each of the beam-splitting surfaces 522, 523 has a nominal orientation with respect to the nominal orientation of the reflective surface 542 of fixed mirror 540. In the example shown, the nominal orientation of each of the beam-splitting surfaces 522, 523 is at 45° with respect to the nominal orientation of fixed mirror 42. Other nominal orientations are possible, as noted above.

DPBS 520 is bifurcated and is composed of a first DPBS portion 512 and a second DPBS portion 514. The first beam-splitting surface 522 of DPBS 520 is bifurcated and is composed a first beam-splitting surface portion 524 and a first beam-splitting surface portion 526. First beam-splitting surface portion 524 constitutes part of first DPBS portion 512 and is oriented at the nominal orientation of first beam-splitting surface 522. First beam-splitting surface portion 526 constitutes part of second DPBS portion 514 and is tilted relative to the nominal orientation of first beam-splitting surface 522. Second beam-splitting surface 523 is composed of a second beam-splitting surface portion 525 that constitutes part of first DPBS portion 512, and a second beam-splitting surface portion 527 that constitutes part of second DPBS portion 514. Second beam-splitting surface portions 525 and 527 are both oriented at the nominal orientation of second beam-splitting surface 523.

DPBS 520 is located such that a normal (not shown) to the nominal orientation of reflective surface 542 of fixed mirror 540 intersects with a normal (not shown) to the reflective surface 52 of movable mirror 50 within the DPBS. DPBS 520 is oriented such that first beam-splitting surface 522 faces fixed mirror 540 and second beam-splitting surface 523 faces movable mirror 52, and second beam-splitting surface 523 is at its nominal orientation with respect to the nominal orientation of fixed mirror 542, as described above.

Figure 7B:
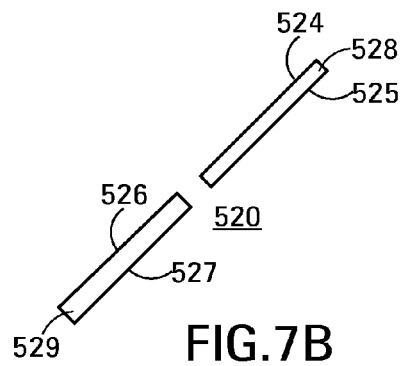
FIG. 7B is a schematic drawing showing another example of the double polarizing beam splitter that constitutes part of the interferometer shown in FIG. 7A.

In the example shown in FIG. 7A, each DPBS portion 512, 514 is embodied as a respective double beam-splitting cube. FIG. 7B is a schematic drawing showing another example of DPBS 520. In this example, first DPBS portion 512 is composed of a parallel-sided slab 528 of a transparent material, such as glass, and second DPBS portion 514 is composed of a non-parallel-sided slab 529 of the transparent material. Layers (not separately shown) of polarizing beam-splitting material are deposited on the opposed major surfaces of slab 528 to provide beam-splitting surface portions 524 and 525, and are deposited on the opposed major surfaces of slab 529 to provide beam-splitting surface portions 526 and 527. Slab 528 is mounted with second beam-splitting surface portion 525 at its nominal orientation with respect to the nominal orientation of the reflective surface 542 of fixed mirror 540. Slab 529 is mounted with second beam-splitting surface portion 527 at its nominal orientation with respect to the nominal orientation of the reflective surface 542 of fixed mirror 540.

Referring again to FIG. 7A, the remaining elements of interferometer 500 and their arrangement are identical to corresponding elements of interferometer 100 described above with reference to FIGS. 3A-3C and will therefore not be described again here.

In interferometer 500, at least part of the reflective surface 542 of fixed mirror 540 is effectively tilted relative to its nominal orientation by physically tilting tilted reflective surface portion 547 that constitutes part of reflective surface 542. Additionally, at least part of the first beam-splitting surface 522 of DPBS 520 is effectively tilted relative to its nominal orientation by physically tilting first beam-splitting surface portion 526. Each of the non-tilted reflective surface portion 549 of fixed mirror 540, the reflective surface 52 of movable mirror 50, the first beam-splitting surface portion 524 of DPBS 520 and the entire second beam-splitting surface 523 of DPBS 520 is oriented at its respective nominal orientation. Other elements or parts thereof of interferometer 500 could additionally be tilted relative to their respective nominal orientations. Each surface that is tilted relative to its nominal orientation reflects light having a direction of incidence parallel or orthogonal to a normal to the nominal orientation of the reflective surface 542 of fixed mirror 540 in a direction of reflection neither parallel nor orthogonal to the direction of incidence.

In the example of interferometer 500 shown in FIG. 7A, DPBS portions 512 and 514, quarter-wave plates 44 and 54 and fixed mirror portions 546 and 548 are shown as separate components to enable these components to be shown clearly. In embodiments in which DPBS 520 is embodied as two double beam-splitting cubes, also as shown in FIG. 7A, quarter-wave plate 44 is typically bifurcated and quarter-wave plate portions are affixed to the cube surfaces of DPBS portions 512 and 514 facing fixed mirror 540. Similarly, quarter-wave plate 54 is typically bifurcated and the quarter-wave plate portions are affixed to the cube surfaces of DPBS portions 512 and 514 facing movable mirror 50. Additionally, first mirror portion 546 may be implemented as a wedge of a transparent material, such as glass, having a layer of reflective material, such as aluminum or gold, on one its tapered surfaces. The reflective material provides reflective surface portion 547, and the taper of the wedge defines the tilt of reflective surface portion 547. Such implementation of mirror portion 546 is mounted on bifurcated quarter-wave plate 44 and DPBS portion 512 with the surface of the wedge opposite reflective surface 542 affixed to the surface of bifurcated quarter-wave plate 44 remote from DPBS portion 512. Similarly, the second mirror portion 548 may be implemented as a layer of reflective material deposited on the surface of the respective portion of bifurcated quarter-wave plate 44 remote from DPBS portion 514. The reflective material provides reflective surface portion 549.

In another example, DPBS portion 512 is implemented as a double beam-splitting cube in which the cube surface facing fixed mirror 540 is tilted relative to its nominal orientation by a tilt equal to the desired tilt of reflective surface portion 547. Quarter-wave plate 44 is bifurcated, and one portion (with its thickness suitably reduced in some embodiments) is affixed to the tilted cube surface. Reflective material deposited on the surface of the quarter-wave plate portion remote from DPBS portion 512 provides reflective surface portion 547. In this example, DPBS portion 514 is also implemented as a double beam-splitting cube. The remaining portion of bifurcated quarter-wave plate 44 is affixed to the cube surface of the DPBS cube facing fixed mirror 540. Reflective material deposited on the surface of the quarter-wave plate portion remote from DPBS portion 512 provides reflective surface portion 549.

In the example shown in FIG. 7A, retroreflector 30 is shown affixed to one of the cube surfaces of DPBS portion 514. Retroreflector 30 may alternatively be spaced from DPBS portion 514. In another example, DPBS portion 514 is implemented as a double beam-splitting cube, and retroreflector 30 and the prism that faces retroreflector 30 in DPBS portion 514 are fabricated from the same piece of optical material as a single optical element.

Regardless of whether two or more of DPBS 520, quarter-wave plates 44 and 54, retroreflector 30 and fixed mirror 540 are affixed to one another, DPBS 520, quarter-wave plates 44 and 54, retroreflector 30 and fixed mirror 540 arranged as described above collectively constitute an optical assembly 510 in accordance with an embodiment of the invention. An interferometer similar to interferometer 500 for measuring the displacement of a body (not shown) can be conveniently fabricated using such optical assembly 510 together with a suitable light source and detector, and a movable mirror mounted on the body.

Figure 7C:
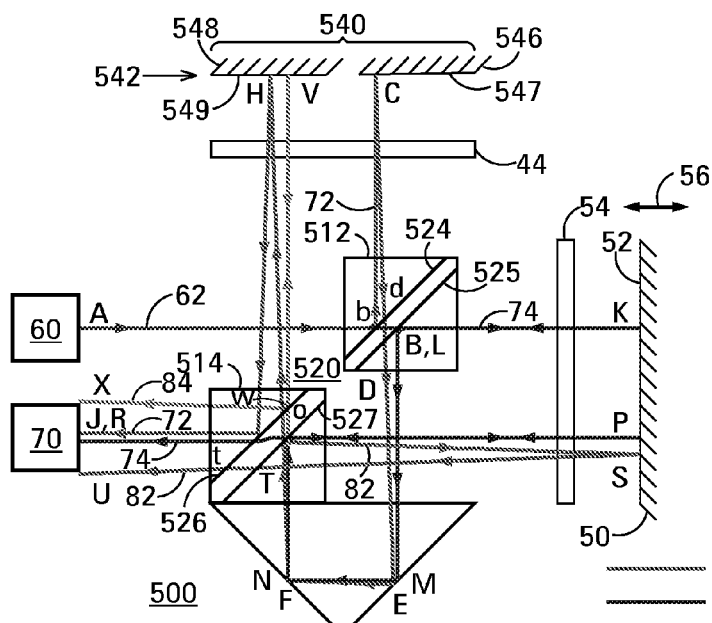
FIG. 7C is a schematic drawing showing examples of the ghost beams to which the interferometer shown in FIG. 7A is subject.

As will be described in greater detail below with reference to FIG. 7C, ghost beams derived from incident beam 62 as a result of imperfections in the elements of interferometer 500 additionally emerge from DPBS 520 and are incident on light sensor 70. Tilting the reflective surface portion 547 of fixed mirror 540 and the first beam-splitting surface portion 526 of DPBS 520 causes such ghost beams to emerge from DPBS 520 with their beam axes diverging from the beam axes of the desired beams, i.e., reference beam 72 and measurement beam 74. The beam axes of the ghost beams diverging from those of the desired beam spatially offsets the beam axes of the ghost beams from those of the desired beams at sensor 70. The beam axes of the ghost beams diverging from those of the desired beams and the spatial offset between the beam axes of the ghost beams and the desired beams reduces the unwanted interference between the ghost beams and the desired beams in a manner similar to that described above.

The tilt of reflective surface portion 547, i.e., the angle between the actual orientation of reflective surface portion 547 and the nominal orientation of reflective surface 542, is set such that ghost reference beam 82 (FIG. 7C) emerges from DPBS 520 angularly separated from desired beams 72, 74 by a separation angle greater than a minimum separation angle. The tilt of first beam-splitting surface portion 526, i.e., the angle between the actual orientation of first beam-splitting surface portion 526 and the nominal orientation of first beam-splitting surface 522, is set such that ghost measurement beam 84 (FIG. 7C) emerges from DPBS 520 angularly separated from desired beams 72, 74 by a separation angle greater than a minimum separation angle. Each minimum separation angle is that which ensures that the level of any unwanted interference component generated by sensor 70 in response to interference between the respective ghost beam and desired beams 72, 74 is below an acceptable threshold level. Furthermore, the tilt of reflective surface portion 547 and the tilt of first beam-splitting surface portion 526 are set such that the respective separation angle remains greater than the minimum separation angle over the entire range of movement of the movable body (not shown) to which movable mirror 50 is affixed. The tilt of reflective surface portion 547 and the tilt of first beam-splitting surface portion 526 are typically additionally set such that the separation angle remains greater than the minimum separation angle over the entire range of the above-described rotation to which the orientation of movable mirror 50 is subject.

Simply tilting reflective surface portion 547 and first beam-splitting surface portion 526 imposes a spatial offset on the position at which reference beam 72 emerges from DPBS 520, and a consequent a spatial offset between the beam axes of reference beam 72 and measurement beam 74. The spatial offset of the beam axes undesirably reduces the amplitude of the desired interference component generated by sensor 70 in response to interference between desired beams 72, 74. In DPBS 520, second beam-splitting surface 523 is spatially offset from first beam-splitting surface 522 in a direction parallel to a normal to the nominal orientation of reflective surface 52. By reflecting measurement beam 74 using a beam-splitting surface different from that used to reflect reference beam 72, DPBS 520 imposes a spatial offset on the position at which measurement beam 74 emerges from DPBS. The spatial separation between second beam-splitting surface 523 and first beam-splitting surface 522 is set such that second beam-splitting surface 523 imposes a spatial offset on measurement beam 74 nominally equal to the spatial offset imposed on reference beam 72 by the tilt of reflective surface portion 547 and the tilt of first beam-splitting surface portion 526. As a result, the beam axes of the reference beam and the measurement beam are collinear. This maximizes the amplitude of desired interference component generated by sensor 70 in response to interference between desired beams 72, 74. An alignment operation is typically performed to make the beam axes of the reference beam and the measurement beam collinear.

Operation of the example of interferometer 500 shown in FIG. 7A will now be described. Incident beam 62 is emitted by light source 60 at a location A and is incident at a location b on the non-tilted first beam-splitting surface portion 524 of DPBS 520. The s-polarized component of incident beam 62 is reflected by first beam-splitting surface portion 524 and constitutes reference beam 72. Reference beam passes 72 passes through quarter-wave plate 44 and is incident at a location C on the tilted reflective surface portion 547 of fixed mirror 540. Due to the tilt of reflective surface portion 547, reference beam 72 is incident at a non-zero angle of incidence. Consequently, reflective surface portion 547 reflects reference beam 72 back towards DPBS 520 along a non-reciprocal path that is neither parallel nor orthogonal to incident beam 62.

After the first reflection by fixed mirror 540, reference beam 72 passes back through quarter-wave plate 44. Two passes through quarter-wave plate 44 change reference beam 72 from s-polarized to p-polarized. Reference beam is incident at a location d on first beam-splitting surface portion 524. Location d is spatially offset from location b, described above. First beam-splitting surface portion 524 transmits the reference beam towards second beam-splitting surface portion 525. Reference beam 72 is incident at a location D on second beam-splitting surface portion 525. Second beam-splitting surface portion 525 transmits the reference beam towards retroreflector 30.

Retroreflector 30 reflects reference beam 72 at locations E and F, after which the reference beam passes back into DPBS 520, specifically into DPBS portion 514, along a path parallel to, but offset from, the path of the reference beam between locations D and E.

Reference beam 72 is incident on the second beam-splitting surface portion 527 of DPBS 520 at a location G. Second beam-splitting surface portion 527 transmits reference beam 72 towards first beam-splitting surface portion 526. Reference beam is incident at a location g on first beam-splitting surface portion 526. First beam-splitting surface portion 526 transmits the reference beam towards fixed mirror 540. Reference beam 72 passes once more through quarter-wave plate 44, and is incident on the non-tilted reflective surface portion 549 of fixed mirror 540 at a location H. Due to the tilt of first reflective surface portion 547, reference beam 72 is incident on reflective surface portion 549 at a non-zero angle of incidence. Consequently, reflective surface portion 549 reflects reference beam 72 back towards DPBS 520 along a non-reciprocal path that is parallel to the path of the reference beam between locations b and C.

After the second reflection by fixed mirror 540, reference beam 72 passes again through quarter-wave plate 44. The final pass through quarter-wave plate 44 restores reference beam 72 to s-polarized. Reference beam 72 is incident at a location i on the first beam-splitting surface portion 526 of DPBS 520, specifically of DPBS portion 514. Location i is spatially offset from location g, described above. First beam-splitting surface portion 526 is tilted and reflects reference beam 72 towards sensor 70. After reflection, the reference beam emerges from DPBS portion 514 in a direction parallel to incident beam 62 and is incident on sensor 70 at a location J.

The p-polarized component of incident beam 62 is also incident at location b on the first beam-splitting surface portion 524 of DPBS 520, specifically of DPBS portion 512. First beam-splitting surface portion 524 transmits the p-polarized component of incident beam 62 towards a location B on second beam-splitting surface portion 525 as a measurement beam 74. Second beam-splitting surface portion 525 transmits measurement beam 74 towards movable mirror 50. Measurement beam 74 passes through quarter-wave plate 54 and is incident at a zero angle of incidence at a location K on the reflective surface 52 of movable mirror 50. Reflective surface 52 reflects measurement beam 74 towards DPBS portion 512 along a reciprocal path.

After the first reflection by movable mirror 50, measurement beam 74 passes back through quarter-wave plate 54. Two passes through the quarter-wave plate 54 change the measurement beam 74 from p-polarized to s-polarized. Measurement beam 74 is incident at a location L on second beam-splitting surface portion 525. Location L is coincident with location B, described above. Second beam-splitting surface portion 525 reflects measurement beam 74 towards retroreflector 30 along a path orthogonal to incident beam 62.

Retroreflector 30 reflects measurement beam 74 at locations M and N, after which the measurement beam passes back into DPBS 520, specifically into DPBS portion 514, along a path parallel to, but offset from, the path of the measurement beam between locations L and M.

Measurement beam 74 is incident on the second beam-splitting surface portion 527 of DPBS 520 at a location O. Location O is spatially offset from location G, where reference beam 72 is incident on second beam-splitting surface portion 527. Second beam-splitting surface portion 527 is not tilted and reflects measurement beam 74 towards movable mirror 50 in a direction parallel to incident beam 62. Measurement beam 74 passes through quarter-wave plate 54 and is incident at a zero angle of incidence at a location P on the reflective surface 52 of movable mirror 50. Reflective surface 52 reflects measurement beam 74 towards DPBS 520 along a reciprocal path.

After the second reflection by movable mirror 50, measurement beam 74 passes once more through the quarter-wave plate 54. The final pass through quarter-wave plate 54 restores measurement beam 74 to p-polarized. Measurement beam 74 is incident at a location Q on the second beam-splitting surface portion 527 of DPBS 520, specifically of DPBS portion 514. Location Q is coincident with location O, described above. Second beam-splitting surface portion 527 transmits measurement beam 74 towards first beam-splitting surface portion 526. Measurement beam 74 is incident at a location q on first beam-splitting surface portion 526. Location q is coincident with location i, described above. First beam-splitting surface portion 526 transmits measurement beam 74 towards sensor 70.

After transmission by first beam-splitting surface portion 526, measurement beam 74 emerges from DPBS 520 and is incident on sensor 70 at a location R. In a manner similar to that described above, sensor 70 electrically detects the superposed light beams 72 and 74 to generate an electrical signal that includes a desired interference component that represents the interference between light beams 72 and 74.

Location R is coincident with location J. Measurement beam 74 is nominally superposed with reference beam 72, and the beam axes of reference beam 72 and measurement beam 74 are parallel and coincident. Note that if the separation between the first beam-splitting surface 522 and second beam-splitting surface 523 of DPBS 520 does not impose a spatial offset on the measurement beam equal to the spatial offset imposed on the reference beam by the tilt of the reflective surface portion 547, the beam axes remain parallel, but are spatially offset from one another.

The elements of interferometer 500 are subject to defects similar to those described above, so that interferometer 500 is subject to ghost beams. FIG. 7C is a schematic diagram that additionally shows the paths of exemplary ghost beams, i.e., ghost reference beam 82 and ghost measurement beam 84, in interferometer 500. The paths of reference beam 72 and measurement beam 74, i.e., desired beams 72, 74, shown in FIG. 7C are the same as those described above with reference to FIG. 7A.

As noted above, after reflection once by fixed mirror 540, reference beam 72 is incident at location G (FIG. 7A) on the second beam-splitting surface portion 527 of DPBS 520. Second beam-splitting surface portion 527 reflects an unwanted s-polarized component of reference beam 72 towards movable mirror 50 as ghost reference beam 82. Due to the tilt of reflective surface portion 547, the angle of incidence of reference beam 72 on second beam-splitting surface portion 527 is less than 45° so that second beam-splitting surface portion 527 reflects ghost reference beam 82 at an angle of reflection that is also less than 45°. Ghost reference beam 82 passes through quarter-wave plate 54 and is incident at a non-zero angle of incidence at a location S on the reflective surface 52 of movable mirror 50. Reflective surface 52 reflects ghost reference beam 82 back towards DPBS 520 along a non-reciprocal path that is neither parallel nor orthogonal to incident beam 62.

After reflection once by fixed mirror 540 and once by movable mirror 50, ghost reference beam 82 passes back through quarter-wave plate 54. The second pass through quarter-wave plate 54 changes ghost reference beam 82 from s-polarized to p-polarized. Ghost reference beam 82 is incident at a location T on second beam-splitting surface portion 527. Location T is spatially offset from locations O and Q, described above and shown in FIG. 7A. Second beam-splitting surface portion 527 transmits ghost reference beam 82 towards first beam-splitting surface portion 526. Ghost reference beam 82 is incident at a location t on first beam-splitting surface portion 526. First beam-splitting surface portion 527 transmits ghost reference beam 82 towards sensor 70. After transmission by first beam-splitting surface portion 526, ghost reference beam 82 emerges from DPBS 520, and is incident on sensor 70 at a location U.

As a result of the tilt of reflective surface portion 547, the angle of incidence of reference beam 72 on second beam-splitting surface portion is less than 45°. Consequently, the angle of reflection of ghost reference beam 82 is less than 45° and ghost reference beam 82 is incident on the reflective surface 52 of movable mirror 50 with a non-zero angle of incidence. After reflection by reflective surface 52 and transmission by second beam-splitting surface portion 527 and first beam-splitting surface portion 526, ghost reference beam 82 emerges from DPBS 520 with its beam axis diverging from the beam axes of desired beams 72, 74, and with its beam axis spatially offset from the beam axes of the desired beams.

As noted above, after reflection once by movable mirror 50, measurement beam 74 is incident at location O (FIG. 7A) on the second beam-splitting surface portion 527 of DPBS 520 with a direction of incidence orthogonal to the direction of incident light beam 62. Second beam-splitting surface portion 527 transmits an unwanted p-polarized component of the measurement beam towards the tilted portion 526 of first beam-splitting surface 522 as ghost measurement beam 84. Ghost measurement beam 84 in incident at a location o on first beam-splitting surface portion 526. First beam-splitting surface portion 526 transmits ghost measurement beam 84 towards fixed mirror 540 in a direction orthogonal to incident light beam 62. Ghost measurement beam 84 passes through quarter-wave plate 44 and is incident at a location V on the reflective surface portion 549 of fixed mirror 540. Reflective surface portion 549 is not tilted, so that ghost measurement beam 84 is incident on reflective surface portion 549 at a zero angle of incidence, and reflective surface portion 549 reflects the ghost measurement beam back towards DPBS 520, specifically DPBS portion 514, along a reciprocal path.

After reflection once by fixed mirror 540 and once by movable mirror 50, ghost measurement beam 84 passes once more through quarter-wave plate 44. The second pass through quarter-wave plate 44 changes ghost measurement beam 84 from p-polarized to s-polarized. Ghost measurement beam 84 is incident at a location w on the first beam-splitting surface portion 526 of DPBS 520. Location w is spatially offset from location o, described above. As a result of the tilt of first beam-splitting surface portion 526, the angle of incidence of ghost measurement beam 84 on first beam-splitting surface portion 526 is less than 45°, so that first beam-splitting surface portion 526 reflects ghost measurement beam 74 towards sensor 70 with an angle of reflection that is less than 45°. After reflection by first beam-splitting surface portion 526, ghost measurement beam 84 emerges from DPBS portion 514 and is incident on sensor 70 at a location X.

As a result of the tilt of first beam-splitting surface portion 526, ghost measurement beam 84 emerges from DPBS portion 514 with its beam axis diverging from the beam axes of desired beams 72, 74, and with its beam axis spatially offset from the beam axes of the desired beams.

The beam axes of ghost beams 82, 84 diverging from those of desired beams 72, 74 as the beams are incident on sensor 70 is sufficient to reduce interference between ghost beams 82, 84 and desired beams 72, 74 even when there is some spatial overlap between the ghost beams and the desired beams. However, the beam axes of the ghost beams diverging from those of the desired beams typically additionally reduces beam overlap between the ghost beams and the desired beams. In this regard, it should be noted that the beam overlap between ghost beams 82, 84 and desired beams 72, 74 at sensor 70 varies depending on the distance between movable mirror 50 and DPBS 520.

Figure 8A:
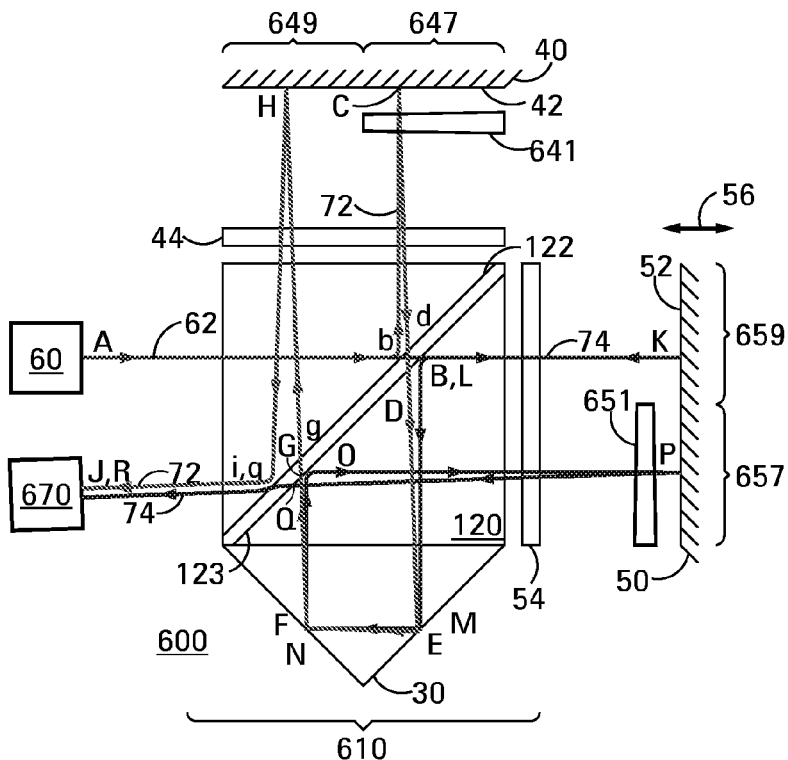
FIG. 8A is a schematic drawing showing an example of an interferometer in accordance with an embodiment of the invention in which part of the reflective surface of the fixed mirror and part of the reflective surface of the movable mirror are effectively tilted using respective prisms.

FIG. 8A is a schematic drawing showing an example of an interferometer 600 in accordance with an embodiment of the invention. In interferometer 600, none of the reflective surfaces and beam-splitting surfaces is physically tilted. Instead, part of the reflective surface of the fixed mirror is effectively tilted by a prism located between the DPBS and the part of the fixed mirror, and part of the reflective surface of the movable mirror is effectively tilted by a prism located between the DPBS and the part of the movable mirror.

Interferometer 600 is composed of double polarizing beam splitter (DPBS) 120, retroreflector 30, fixed plane mirror 40, movable plane mirror 50, quarter-wave plate 44, quarter-wave plate 54, a prism 641 and a prism 651. Fixed mirror 40 is in a fixed location relative to DPBS 120 and has a reflective surface 42. Reflective surface 42 has a nominal orientation. Movable mirror 50 is affixed to a body (not shown) whose displacement is to be measured using interferometer 600 and has a plane reflective surface 52. The reflective surface 52 of movable mirror 50 has a nominal orientation orthogonal to the nominal orientation reflective surface 42 of fixed mirror 40 and to the direction of motion 56 of movable mirror 50. In some applications, the body to which movable mirror 50 is affixed is capable of rotation about one or more axes orthogonal to the direction of motion, as described above. Fixed mirror 40 and movable mirror 50 are both oriented at their nominal orientations.

In this embodiment, prism 641 is located between DPBS 120 and a portion 647 of the reflective surface 42 of fixed mirror 40 that receives reference beam 72 after the reference beam has been first reflected by the first beam-splitting surface 122 of DPBS 120. Prism 641 causes reflective surface portion 647 to reflect light as if the reflective surface portion were physically tilted, notwithstanding all of reflective surface 42 being physically oriented at its nominal orientation. After refraction by prism 641, reflection by reflective surface portion 647, and refraction a second time by prism 641, incident light travelling in a direction of incidence orthogonal to the nominal orientation of reflective surface 42 travels in a direction not parallel to the direction of incidence.

No prism is located between DPBS 120 and the remaining portion 649 of reflective surface 42 that reflects reference beam 72 after the reference beam has been transmitted twice by the beam-splitting surfaces of the DPBS. Reflective surface portion 649 reflects incident light travelling in a direction of incidence orthogonal to the nominal orientation of reflective surface 42 in a direction of reflection parallel to the direction of incidence.

Additionally, in this embodiment, a prism 651 is located between DPBS 120 and a portion 657 of the reflective surface 52 of movable mirror 50 that receives measurement beam 74 after the measurement beam has been twice reflected by the second beam-splitting surface 123 of DPBS 120. Prism 651 causes reflective surface portion 657 to reflect light as if the reflective surface portion were physically tilted, notwithstanding all of reflective surface 52 being physically oriented at its nominal orientation. After refraction by prism 651, reflection by reflective surface portion 657, and refraction a second time by prism 651, incident light travelling in a direction of incidence orthogonal to the nominal orientation of reflective surface 52 travels in a direction not parallel to the direction of incidence.

No prism is located between DPBS 120 and the remaining portion 659 of reflective surface 52 that reflects measurement beam 74 after the measurement beam has been transmitted twice by the beam-splitting surfaces of the DPBS. Reflective surface portion 659 reflects incident light travelling in a direction of incidence orthogonal to the nominal orientation of reflective surface 52 in a direction of reflection parallel to the direction of incidence and will be referred to as non-tilted reflective surface portion 659.

Reference beam 72 and measurement beam 74 emerge from DPBS 120 in a direction non-parallel to the direction of incident light 62 generated by light source 60. Sensor 670, which is otherwise identical to above-described sensor 70, is oriented so that its light-sensitive surface (not shown) is orthogonal to the beam axes of reference beam 72 and measurement beam 74.

In the example shown in FIG. 8A, prism 641 and prism 651 are each implemented using a single prism. Alternatively, either or both of prism 641 and prism 651 may each be implemented using a respective prism set. A prism set is composed of two or more prisms and is more easily adjusted than a single prism. The term prism as used in this disclosure will be regarded as encompassing both a single prism and a prism set.

The remaining elements of interferometer 600 and their arrangement are identical to corresponding elements of interferometer 100 described above with reference to FIGS. 3A-3C and will therefore not be described again here.

In the example shown in FIG. 8A, DPBS 120 is embodied as a double beam-splitting cube. DPBS 120 may alternatively be embodied as a parallel-sided slab as described above with reference to FIG. 3B.

In interferometer 600, part of the reflective surface 42 of fixed mirror 40 is effectively tilted relative to its nominal orientation by prism 641 interposed between DPBS 120 and the reflective surface portion 647 of reflective surface 42. Prism 641 causes reflective surface portion 647 to reflect light as if it were tilted, notwithstanding reflective surface 42 being oriented at its nominal orientation. Similarly, part of the reflective surface 52 of movable mirror 50 is effectively tilted relative to its nominal orientation by prism 651 interposed between DPBS 120 and the reflective surface portion 657 of reflective surface 52. Prism 651 causes reflective surface portion 657 to reflect light as if it were tilted, notwithstanding reflective surface 52 being oriented at its nominal orientation. However, prism 652 leaves non-tilted reflective surface portion 649 untilted.

Other elements of interferometer 600 or parts of such elements could additionally or alternatively be effectively tilted relative to their respective nominal orientations by interposing respective prisms. Each surface that is effectively tilted relative to its nominal orientation reflects light having a direction of incidence parallel or orthogonal to a normal to the nominal orientation of the reflective surface 42 of fixed mirror 40 in a direction of reflection neither parallel nor orthogonal to the direction of incidence.

In the example of interferometer 600 shown in FIG. 8A, DPBS 120, quarter-wave plates 44 and 54 and fixed mirror 40 are shown as separate components to enable these components to be shown clearly. In embodiments in which DPBS 120 is embodied as a double beam-splitting cube, also as shown in FIG. 8A, quarter-wave plate 44 is typically affixed to the cube surface of DPBS 120 facing fixed mirror 40. Additionally, prism 641 may be affixed to part of the surface of quarter-wave plate 44 remote from DPBS 120, and a layer of reflective material may be deposited on the surface or prism 641 remote from quarter-wave plate 44 and the exposed surface of quarter-wave plate remote from DPBS 120 to provide fixed mirror 40. The portion of the reflective material deposited on the surface of prism 641 provides the reflective surface portion 647 of fixed mirror 40, and the portion of the reflective material deposited on the surface of quarter-wave plate 44 provides the reflective surface portion 649 of fixed mirror 40. Similarly, quarter-wave plate 54 is typically affixed to the cube surfaces of DPBS 120 facing movable mirror 50, and prism 651 may be affixed to part of the surface of quarter-wave plate 54 remote from DPBS 120.

In the example shown in FIG. 8A, retroreflector 30 is shown affixed to one of the cube surfaces of DPBS 120. Retroreflector 30 may alternatively be spaced from DPBS 120. In another example, DPBS 120 is implemented as a double beam-splitting cube, and retroreflector 30 and one of the prisms constituting the DPBS, i.e., the prism that provides the cube surface facing the retroreflector, are fabricated from the same piece of optical material as a single optical element.

Regardless of whether two or more of DPBS 120, quarter-wave plates 44 and 54, retroreflector 30 and fixed mirror 40 are affixed to one another, DPBS 120, quarter-wave plates 44 and 54, retroreflector 30, fixed mirror 40, prism 641 and prism 651 arranged as described above collectively constitute an optical assembly 610 in accordance with an embodiment of the invention. An interferometer similar to interferometer 600 for measuring the displacement of a body (not shown) can be conveniently fabricated using such optical assembly 610 together with a suitable light source, detector, and a movable mirror mounted on the body.

Figure 8B:
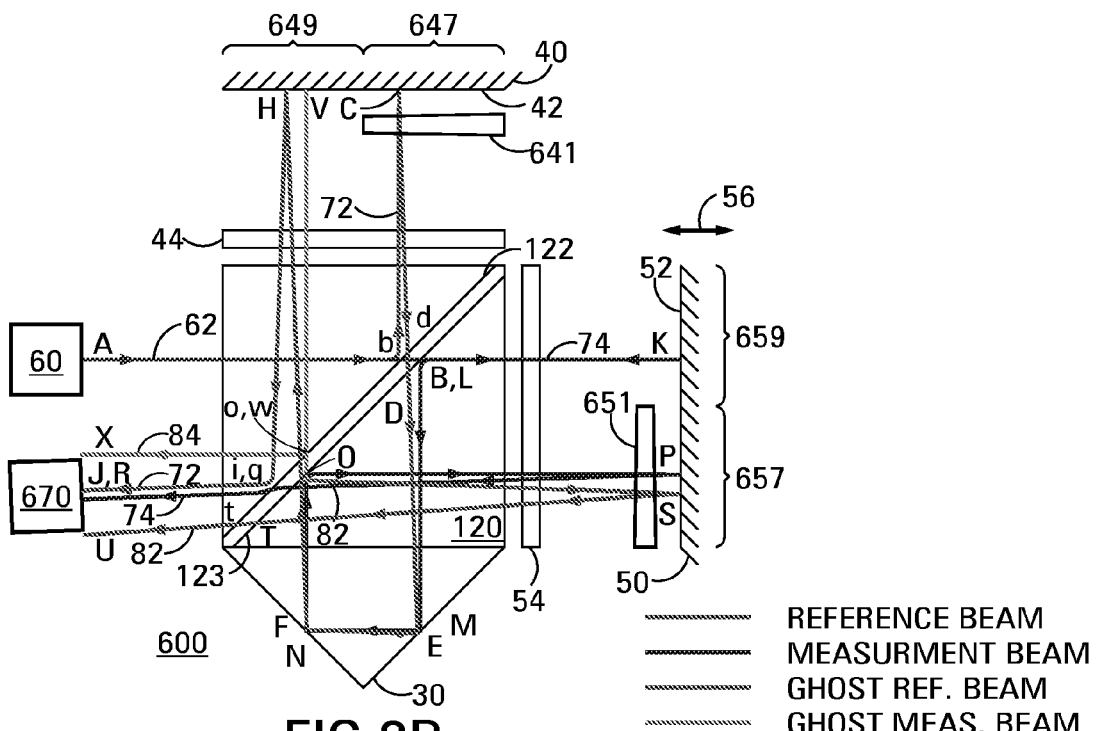
FIG. 8B is a schematic drawing showing examples of the ghost beams to which the interferometer shown in FIG. 8A is subject.

As will be described in greater detail below with reference to FIG. 8B, ghost beams derived from incident beam 62 as a result of imperfections in the elements of interferometer 600 additionally emerge from DPBS 120 and are incident on light sensor 670. The effective tilt of the reflective surface portion 647 of fixed mirror 40 and the effective tilt of the reflective surface portion 657 of movable mirror 50 cause such ghost beams to emerge from DPBS 120 with their beam axes diverging from the beam axes of the desired beams, i.e., reference beam 72 and measurement beam 74. The beam axes of the ghost beams diverging from those of the desired beams spatially offsets the beam axes of the ghost beams from those of the desired beams at sensor 670. The beam axes of the ghost beams diverging from those of the desired beams and the spatial offset between the beam axes of the ghost beams and the desired beams reduces the unwanted interference between the ghost beams and the desired beams in a manner similar to that described above.

The effective tilt of reflective surface portion 647, i.e., the angle of a virtual reflective surface that would reflect light incident orthogonally to the nominal orientation of reflective surface 42 at the same angle of reflection as the combination of reflective surface portion 647 and prism 641, is set such that ghost reference beam 82 (FIG. 8B) emerges from DPBS 120 angularly separated from desired beams 72, 74 by a separation angle greater than a minimum separation angle. The effective tilt of reflective surface portion 657, i.e., the angle of a virtual reflective surface that would reflect light incident orthogonally to the nominal orientation of reflective surface 52 at the same angle of reflection as the combination of reflective surface 52 and prism 651, is set such that ghost measurement beam 84 (FIG. 8B) emerges from DPBS 120 angularly separated from desired beams 72, 74 by a separation angle greater than a minimum separation angle. Each minimum separation angle is that which ensures that the level of any unwanted interference component generated by sensor 70 in response to interference between the respective ghost beam and desired beams 72, 74 is below an acceptable threshold level. Furthermore, the effective tilt of reflective surface portion 647 and the effective tilt of reflective surface portion 657 are set such that the respective separation angle remains greater than the minimum separation angle over the entire range of movement of the movable body (not shown) to which movable mirror 50 is affixed. The effective tilt of reflective surface portion 647 and the effective tilt of reflective surface portion 657 are typically additionally set such that the separation angle remains greater than the minimum separation angle over the entire range of the above-described rotation to which the orientation of movable mirror 50 is subject. For a given prism material, the apex angle of prism 641 and the apex angle of prism 651 define the effective tilt of tilted reflective surface portion 647 and tilted reflective surface portion 657, respectively.

The effective tilts of reflective surface portions 647 and 657 and the spatial offset between the first beam-splitting surface 122 and second beam-splitting surface 123 of DPBS 120 are set such that the beam axes of reference beam 72 and measurement beam 74 are collinear as the beams emerge from DPBS 120. This maximizes the amplitude of desired interference component generated by sensor 670 in response to interference between desired beams 72, 74. An alignment operation is typically performed to make the beam axes of the reference beam and the measurement beam collinear.

Operation of the example of interferometer 600 shown in FIG. 8A will now be described. Incident beam 62 is emitted by light source 60 at a location A and is incident at a location b on the first beam-splitting surface 122 of DPBS 120. The s-polarized component of incident beam 62 is reflected by first beam-splitting surface 122 and constitutes reference beam 72. Reference beam 72 passes through quarter-wave plate 44 and is incident on prism 641. Refraction by prism 641 imposes a deflection on reference beam 72 so that the reference beam is incident at a non-zero angle of incidence at a location C on the reflective surface portion 647 of fixed mirror 40. Reflective surface portion 647 reflects reference beam 72 back towards prism 641 along a non-reciprocal path that is neither parallel nor orthogonal to incident beam 62. Refraction by prism 641 a second time imposes an additional deflection on reference beam 72. Thus, after refraction twice by prism 641 and reflection by reflective surface 42, reference beam 72 returns to DPBS 120 along a path similar to the corresponding part of the reference beam path described above with reference to FIG. 3A in which reflective surface 142 is physically tilted. Thus, prism 641 and reflective surface 42 collectively provide reflective surface portion 647 with reflection properties similar to physically-tilted reflective surface 142.

After reflection by reflective surface portion 647, reference beam 72 passes through quarter-wave plate 44, DPBS 120, retroreflector 30, DPBS 120 and quarter-wave plate 44 and returns to reflective surface 42 along a path substantially similar to the corresponding part of the reference beam path described above with reference to FIG. 3A. After passing through quarter-wave plate 44 the second time, reference beam 72 is incident on the reflective surface portion 649 of fixed mirror 40 at a location H. Due to the effective tilt of reflective surface portion 647, reference beam 72 is incident on reflective surface portion 649 at a non-zero angle of incidence. Consequently, reflective surface portion 649 reflects reference beam 72 back towards DPBS 120 along a non-reciprocal path.

After reflection by the reflective surface portion 647 and the reflective surface portion 649 of fixed mirror 40, reference beam 72 passes again through quarter-wave plate 44. The final pass through quarter-wave plate 44 restores reference beam 72 to s-polarized. Reference beam 72 is incident at a location i the first beam-splitting surface 122 of DPBS 120. First beam-splitting surface 122 reflects reference beam 72 towards sensor 670. Due to reflective surface portion 647 being effectively tilted and reflective surface portion 649 being non-tilted, the angle of incidence of reference beam 72 at location i on first beam-splitting surface 122 is greater than 45°. Consequently, after reflection, the reference beam emerges from DPBS 120 in a direction not parallel to incident beam 62. Reference beam 72 is incident on sensor 670 at a location J.

The p-polarized component of incident beam 62 is also incident at location b on the first beam-splitting surface 122 of DPBS 120. First beam-splitting surface 122 transmits the p-polarized component of incident beam 62 towards a location B on second beam-splitting surface 123 as a measurement beam 74. After being passed by second beam-splitting surface 123, measurement beam 74 passes through quarter-wave plate 54 and is reflected by the reflective surface portion 659 of movable mirror 50. The measurement beam then passes through quarter-wave plate 54, DPBS 120 and retroreflector 30 and returns to location O on the second beam-splitting surface 123 of DPBS 120 along a path similar to the corresponding part of the measurement beam path described above with reference to FIG. 3A. Second beam-splitting surface 123 reflects measurement beam 74 towards movable mirror 50 in a direction parallel to incident beam 62. Measurement beam 74 passes through quarter-wave plate 54 and is incident on prism 651.

Refraction by prism 651 imposes a deflection on measurement beam 74 so that the measurement beam is incident at a non-zero angle of incidence at a location P on the reflective surface portion 657 of movable mirror 50. Reflective surface portion 657 reflects measurement beam 74 back towards prism 651 along a non-reciprocal path that is neither parallel nor orthogonal to incident beam 62. Refraction by prism 651 a second time imposes an additional deflection on measurement beam 74. Thus, after refraction twice by prism 651 and reflection by reflective surface 42, measurement beam 74 returns to DPBS 120 along a non-reciprocal path. This path is inverse to the corresponding portion of the measurement beam path described above with reference to FIG. 4A in which the reflective surface of the movable mirror is physically tilted. Thus, prism 651 and reflective surface 52 collectively provide reflective surface portion 657 with reflection properties similar to those of physically-tilted reflective surface 252.

After reflection by reflective surface portion 659 and reflective surface portion 657, measurement beam 74 passes back through quarter-wave plate 54. The final pass through quarter-wave plate 54 restores measurement beam 74 to p-polarized. Measurement beam 74 is incident at a location Q on the second beam-splitting surface 123 of DPBS 120. Location Q is spatially offset from location O, described above. Second beam-splitting surface 123 transmits measurement beam 74 towards first beam-splitting surface 122. Measurement beam 74 is incident at a location q on first beam-splitting surface 122. Location q is coincident with location i, described above. First beam-splitting surface 122 transmits measurement beam 74 towards sensor 670.

After transmission by first beam-splitting surface 122, measurement beam 74 emerges from DPBS 120 and is incident on sensor 670 at a location R. In a manner similar to that described above, sensor 670 electrically detects the desired light beams 72 and 74 to generate an electrical signal that includes a desired interference component that represents the interference between light beams 72 and 74.

Location R is coincident with location J. Measurement beam 74 is nominally superposed with reference beam 72. Additionally, measurement beam 74 emerges from DPBS 120 with its beam axis parallel to that of reference beam 72, although the beam axis of neither of desired beams 72, 74 is parallel to that of incident beam 62. Note that if the spatial offsets imposed on the desired beams by effectively tilting reflective surface portions 647 and 657 and the separation distance between the first beam-splitting surface 122 and the second beam-splitting surface 123 of DPBS 120 are different, the beam axes remain parallel, but are spatially offset from one another.

The elements of interferometer 600 are subject to defects similar to those described above, so that interferometer 600 is subject to ghost beams. FIG. 8B is a schematic diagram that additionally shows the paths of exemplary ghost beams, i.e., ghost reference beam 82 and ghost measurement beam 84, in interferometer 600. The paths of reference beam 72 and measurement beam 74, i.e., desired beams 72, 74, shown in FIG. 8B are the same as those described above with reference to FIG. 8A.

As noted above, after reflection once by fixed mirror 40, reference beam 72 is incident at location G (FIG. 8A) on the second beam-splitting surface 123 of DPBS 120. Second beam-splitting surface 123 reflects an unwanted s-polarized component of reference beam 72 towards movable mirror 50 as ghost reference beam 82. Due to the effective tilt of the reflective surface portion 647 of fixed mirror 40, the angle of incidence of reference beam 72 on second beam-splitting surface 123 is less than 45° so that second beam-splitting surface 123 reflects ghost reference beam 82 at an angle of reflection that is also less than 45°. Ghost reference beam 82 passes through quarter-wave plate 54 and is incident at a non-zero angle of incidence on prism 651.

Refraction by prism 651 imposes a deflection on ghost reference beam 82 so that the ghost reference beam is incident at a non-zero angle of incidence at a location S on the reflective surface portion 657 of movable mirror 50. The angle of incidence is greater than without prism 651. Reflective surface portion 657 reflects ghost reference beam 82 back towards prism 651 along a non-reciprocal path. Refraction by prism 651 a second time imposes an additional deflection on ghost reference beam 82. Ghost reference beam 82 travels back towards DPBS 120 along a non-reciprocal path.

After reflection once by fixed mirror 40 and once by movable mirror 50, ghost reference beam 82 passes back through quarter-wave plate 54. The second pass through quarter-wave plate 54 changes ghost reference beam 82 from s-polarized to p-polarized. Ghost reference beam 82 is incident at a location T on second beam-splitting surface 123. Location T is spatially offset from locations O and Q, described above and shown in FIG. 8A. Second beam-splitting surface 123 transmits ghost reference beam 82 towards first beam-splitting surface 122. Ghost reference beam 82 is incident at a location t on first beam-splitting surface 122. First beam-splitting surface 122 transmits ghost reference beam 82 towards sensor 670. After transmission by first beam-splitting surface 122, ghost reference beam 82 emerges from DPBS 120, and is incident on sensor 670 at a location U.

As a result of the reflective surface portion 647 of fixed mirror 40 being tilted, the angle of incidence of reference beam 72 on second beam-splitting surface 123 is less than 45°. Consequently, the angle of reflection of ghost reference beam 82 from second beam-splitting surface 123 is less than 45° and ghost reference beam 82 is incident on the reflective surface portion 657 of movable mirror 50 with a non-zero angle of incidence. After reflection by reflective surface portion 657 and transmission by second beam-splitting surface 123 and first beam-splitting surface 122, ghost reference beam 82 emerges from DPBS 120 with its beam axis diverging from the beam axes of desired beams 72, 74, and with its beam axis spatially offset from the beam axes of the desired beams.

As noted above, after reflection once by movable mirror 50, measurement beam 74 is incident at location O (FIG. 8A) on the second beam-splitting surface 123 of DPBS 120 with a direction of incidence orthogonal to the direction of incident light beam 62. Second beam-splitting surface 123 transmits an unwanted p-polarized component of the measurement beam towards first beam-splitting surface 122 as ghost measurement beam 84. Ghost measurement beam 84 in incident at a location o on first beam-splitting surface 122. First beam-splitting surface 122 transmits ghost measurement beam 84 towards fixed mirror 40 in a direction orthogonal to incident light beam 62. Ghost measurement beam 84 passes through quarter-wave plate 44 and is incident at a location V on the reflective surface portion 649 of fixed mirror 40. Ghost measurement beam 84 is incident on reflective surface portion 649 at a zero angle of incidence, and reflective surface portion 649 reflects the ghost measurement beam back towards DPBS 120 along a reciprocal path.

After reflection once by fixed mirror 40 and once by movable mirror 50, ghost measurement beam 84 passes once more through quarter-wave plate 44. The second pass through quarter-wave plate 44 changes ghost measurement beam 84 from p-polarized to s-polarized. Ghost measurement beam 84 is incident at a location w on the first beam-splitting surface 122 of DPBS 120. Location w is coincident with location o, described above. As a result of the ghost measurement beam being reflected by no tilted surfaces, the angle of incidence of ghost measurement beam 84 on first beam-splitting surface 122 is 45°, so that first beam-splitting surface 122 reflects ghost measurement beam 84 towards sensor 670 with an angle of reflection equal to 45°. After reflection by first beam-splitting surface 122, ghost measurement beam 84 emerges from DPBS 122 in a direction parallel to incident beam 62, and is incident on sensor 670 at a location X.

As a result of reflection by first beam-splitting surface 122 in a direction parallel to that of incident beam 62, ghost measurement beam 84 emerges from DPBS 120 with its beam axis diverging from the beam axes of desired beams 72, 74, and with its beam axis spatially offset from the beam axes of the desired beams.

The beam axes of ghost beams 82, 84 diverging from those of desired beams 72, 74 as the beams are incident on sensor 670 is sufficient to reduce interference between ghost beams 82, 84 and desired beams 72, 74 even when there is some spatial overlap between the ghost beams and the desired beams. However, the beam axes of the ghost beams diverging from those of the desired beams typically additionally reduces beam overlap between the ghost beams and the desired beams. In this regard, it should be noted that the beam overlap between ghost beams 82, 84 and desired beams 72, 74 at sensor 670 varies depending on the distance between movable mirror 50 and DPBS 120.

Interferometers similar to the exemplary interferometers described above with reference to FIGS. 3A, 4A, 5A, 6A, 7A and 8A are used to determine with high precision the displacement of a body to which the movable mirror is affixed. For example, such interferometers are used to determine the displacement of a movable stage (not shown) to which movable mirror 50 or 250 is affixed. In a typical application, the movable stage constitutes part of a photolithographic system used for fabricating semiconductor devices in which the feature sizes are measured in tens of nanometers.

In addition to its movement in translation, the movable stage is additionally capable of rotating within a small range of rotation, typically less than ±2 milliradians, as noted above. Rotation of the movable stage imposes a similar rotation on the orientation of the movable mirror. The interferometer must be able to tolerate a rotation in the orientation of the movable mirror within the defined range of rotation.

In an interferometer in accordance with the invention, the tilt of the tilted surface is set such that the angular separation of each ghost beam and the desired beams is sufficiently large that none of the ghost beams will interfere with any of the desired beams 72, 74 not only statically but over the entire range of the rotation to which the orientation of the movable mirror may be subject. Such interference is undesirable because it causes the above-described sub-harmonic $\lambda/2$ error. Interference between ghost beams and the desired beams becomes appreciable when the angular separation between the ghost beam and the desired beams falls to a value less than a minimum angular separation typically on the order of $\lambda/d$ where $\lambda$ is the wavelength and d is the beam diameter of incident light beam 62. For a typical example of an interferometer in accordance with an embodiment of the invention, the minimum angular separation is 633 nm/6 mm, i.e., about 0.1 milliradian.

In other examples of an interferometer and an optical assembly in accordance with an embodiment of the invention, one or both of the fixed mirror and the movable mirror is tilted in addition to one or both of the first and second reflective surfaces of the DPBS. In yet other examples, the fixed mirror reflects the p-polarized component transmitted by the DPBS and the movable mirror reflects the s-polarized component reflected by the first beam-splitting surface of the DPBS. In yet other examples, the interferometer is a differential interferometer, the optical assembly constitutes the optical assembly of a differential interferometer, and the mirror described above as fixed mirror 40 is affixed to an additional movable object in a manner similar to that described above with reference to movable mirror 50. In yet other examples, instead of measuring displacement at a single measurement point by directing light along a single pair of beams, the interferometer and the optical assembly are structured to measure displacements at multiple measurement points by directing light along a pair of beams for each measurement point.

Interferometers and optical assemblies in accordance with the various embodiments of the invention are made using conventional high-precision optical fabrication techniques. In particular, techniques for fabricating reflective surfaces having a precisely-defined tilt relative to a nominal orientation are known in the art and may be used to fabricate the various tilted reflective surfaces and tilted beam-splitting surfaces referred to herein. Examples of fabrication processes that can be used are described in U.S. Pat. Nos. 6,542,247 of Bockman, entitled Multi-Axis Interferometer with Integrated Optical Structure and Method for Manufacturing Rhomboid Assemblies, 7,035,025 of Prince et al, entitled Compact Precision Beam Manipulators, and 7,119,972 of Prince, entitled Apparatus and Method for the Manipulation of a Laser Beam in Reflection, and in U.S. patent application publication no. 2007 0024976 of Belt et al., entitled High Efficiency Beam Distribution with Independent Wavefront Correction. All are assigned to the assignee of this disclosure and are incorporated by reference.

This disclosure describes the invention in detail using illustrative embodiments. However, the invention defined by the appended claims is not limited to the precise embodiments described.

We claim:

1. An interferometer, comprising:
a first reflective surface having a nominal orientation;
a second reflective surface having a nominal orientation orthogonal to the nominal orientation of the first reflective surface;
a retroreflector facing the first reflective surface;
a double polarizing beam splitter (DPBS) between the first reflective surface and the retroreflector, the DPBS comprising a first beam-splitting surface and a second beam-splitting surface, the beam-splitting surfaces each having a nominal orientation with respect to the nominal orientation of the first reflective surface; and
a quarter-wave plate between the double polarizing beam splitter and each of the first reflective surface and the second reflective surface; in which
at least part of at least one of the first reflective surface, the second reflective surface, the first beam-splitting surface and the second beam-splitting surface is effectively tilted relative to the respective nominal orientation thereof and constitutes a respective tilted surface.

2. The interferometer of claim 1, additionally comprising:
a light source operable to emit a beam of incident light towards the first beam-splitting surface in a direction orthogonal to the nominal orientation of the second reflective surface; and
a light sensor positioned to receive a first desired light beam and a second desired light beam that emerge from the DPBS, the first desired light beam after being reflected twice by the first reflective surface, the second desired light beam after being reflected twice by the second reflective surface.

3. The interferometer of claim 2, in which:
at least one ghost light beam derived from the beam of incident light additionally emerges from the DPBS; and
the tilted surface has an effective tilt such that each of the ghost light beams emerges from the DPBS angularly separated from the desired light beams by a separation angle greater than a minimum separation angle.

4. The interferometer of claim 3, in which:
the incident light beam has a beam diameter d and a mean wavelength $\lambda$; and
the tilted surface is tilted such that the minimum separation angle is greater than $\lambda/d$.

5. The interferometer of claim 4, in which one of the first reflective surface and the second reflective surface is affixed to a movable body movable in a direction orthogonal to the nominal orientation of the reflective surface affixed thereto.

6. The interferometer of claim 5, in which:
the movable body is movable over a range of movement; and
the tilted surface has an effective tilt such that the separation angle remains greater than the minimum separation over the range of movement of the movable body.

7. The interferometer of claim 5, in which:
the movable body subjects the reflective surface affixed thereto to rotation within a range of rotation; and
the tilted surface has an effective tilt such that the separation angle remains greater than the minimum separation angle notwithstanding the rotation of the reflective surface within the range of rotation.

8. The interferometer of claim 2, in which:
the desired light beams emerge from the DPBS, one after being reflected twice by the tilted surface, the other having not been reflected by the tilted surface;
the tilted surface has an effective tilt that imposes a first spatial offset on the one of the desired light beams;
the first beam-splitting surface and the second beam-splitting surface are separated by a separation distance that imposes a second spatial offset on the other of the desired light beams; and
the second spatial offset is nominally equal to the first spatial offset.

9. The interferometer of claim 8, in which:
one of the first reflective surface and the second reflective surface is affixed to a movable body movable in a direction orthogonal to the nominal orientation of the reflective surface affixed thereto, the movable body having a range of movement; and
the second spatial offset differs from the first spatial offset by no more than a defined difference over the range of movement of the movable body.

10. The interferometer of claim 1, in which the first reflective surface is physically tilted to provide the tilted surface.

11. The interferometer of claim 1, in which the second reflective surface is physically tilted to provide the tilted surface.

12. The interferometer of claim 1, in which at least one of part of the first reflective surface and part of the second reflective surface is physically tilted to provide the tilted surface.

13. The interferometer of claim 1, in which the first beam-splitting surface is physically tilted to provide the tilted surface.

14. The interferometer of claim 1, in which the second beam-splitting surface is physically tilted to provide the tilted surface.

15. The interferometer of claim 1, additionally comprising a prism located between the DPBS and at least part of one of the reflective surfaces, the prism and the one of the reflective surfaces collectively providing the tilted surface.

16. The interferometer of claim 15, in which the one of the reflective surfaces is not physically tilted.

17. The interferometer of claim 15, in which the prism is located between the DPBS and only part of the one of the reflective surfaces.

18. An optical assembly, comprising:
a reflective surface having a nominal orientation;
a retroreflector facing the reflective surface;
a double polarizing beam splitter (DPBS) between the reflective surface and the retroreflector, the DPBS comprising a first beam-splitting surface facing the reflective surface and a second beam-splitting surface facing the retroreflector, each of the beam-splitting surfaces having a nominal orientation with respect to the nominal orientation of the reflective surface;
a first quarter-wave plate between the DPBS and the reflective surface;
a second quarter-wave plate facing the second beam-splitting surface and nominally orthogonal to the first quarter-wave plate; in which:
at least part of at least one of the reflective surface, the first beam-splitting surface and the second beam-splitting surface is effectively tilted relative to the respective nominal orientation thereof and constitutes a respective tilted surface.

19. The optical assembly of claim 18, in which the reflective surface is physically tilted to provide the tilted surface.

20. The optical assembly of claim 18 in which one of the first beam-splitting surface and the second beam-splitting surface is physically tilted to provide the tilted surface.

21. The optical assembly of claim 18, in which:
at least one ghost light beam derived from the incident light additionally emerges from the DPBS; and
the tilted surface has a tilt such that each of the ghost beams emerges from the DPBS angularly separated from the desired light beams by a respective separation angle greater than a minimum separation angle.

22. The optical assembly of claim 18, additionally comprising a prism located between the DPBS and at least part of the reflective surface, the prism and the reflective surface collectively providing the tilted surface.

23. The optical assembly of claim 22, in which the reflective surface is not physically tilted.

24. The optical assembly of claim 22, in which the prism is located between the DPBS and only part of the reflective surface.

* * * * *